(12) United States Patent
Passmore et al.

(10) Patent No.: US 11,851,961 B1
(45) Date of Patent: Dec. 26, 2023

(54) MAGNETICALLY COUPLED SUBSURFACE CHOKE

(71) Applicant: Halliburton Energy Services, Inc., Houston, TX (US)

(72) Inventors: Kevin Robin Passmore, Carrollton, TX (US); Bruce Edward Scott, Carrollton, TX (US)

(73) Assignee: Halliburton Energy Services, Inc., Houston, TX (US)

(*) Notice: Subject to any disclaimer, the term of this patent is extended or adjusted under 35 U.S.C. 154(b) by 13 days.

(21) Appl. No.: 17/836,352

(22) Filed: Jun. 9, 2022

(51) Int. Cl.
*E21B 23/03* (2006.01)
*E21B 34/02* (2006.01)
*F16K 31/08* (2006.01)
*E21B 34/12* (2006.01)

(52) U.S. Cl.
CPC ............ *E21B 23/03* (2013.01); *E21B 34/025* (2020.05); *F16K 31/086* (2013.01); *E21B 34/12* (2013.01); *E21B 2200/02* (2020.05)

(58) Field of Classification Search
CPC .... E21B 2200/02; E21B 34/025; E21B 23/03; E21B 34/12; F16K 31/086
See application file for complete search history.

(56) References Cited

U.S. PATENT DOCUMENTS

| 4,066,128 | A | 1/1978 | Davis et al. | |
|---|---|---|---|---|
| 6,988,556 | B2* | 1/2006 | Vick, Jr. ............... | E21B 34/101 166/66.5 |
| 7,967,074 | B2 | 6/2011 | Lake et al. | |
| 8,869,881 | B2 | 10/2014 | Vick, Jr. et al. | |
| 8,919,730 | B2 | 12/2014 | Vick, Jr. et al. | |
| 9,482,361 | B2* | 11/2016 | Petrangeli ............. | F16K 31/088 |
| 9,784,083 | B2* | 10/2017 | Trautman ............... | E21B 34/12 |

(Continued)

FOREIGN PATENT DOCUMENTS

| CN | 202850987 U | 4/2013 |
|---|---|---|
| WO | 2011072121 A2 | 6/2011 |

(Continued)

*Primary Examiner* — Aaron L Lembo
(74) *Attorney, Agent, or Firm* — Scott Richardson; Parker Justiss, P.C.

(57) ABSTRACT

Provided is a retrievable choke insert. The retrievable choke insert, in one aspect, includes an outer housing including a central bore extending axially through the outer housing, an open end, a closed end, and one or more outer housing openings extending through an outer housing sidewall thickness, and a bore flow management actuator disposed in the central bore, the bore flow management actuator having one or more bore flow management openings extending through a bore flow management actuator sidewall thickness, the bore flow management actuator operable to convey subsurface production fluids there through. The retrievable choke insert, in accordance with this aspect, further includes one or more choke insert magnets coupled to the bore flow management actuator, the one or more choke insert magnets configured to magnetically couple with one or more landing nipple magnets of a choke landing nipple to slide the bore flow management actuator and move the one or more bore flow management openings relative to the one or more outer housing openings to control an amount of the subsurface production fluid entering the bore flow management actuator.

34 Claims, 37 Drawing Sheets

(56) References Cited

U.S. PATENT DOCUMENTS

| | | | |
|---|---|---|---|
| 10,012,325 B2 * | 7/2018 | Bohaychuk | F16K 47/08 |
| 10,428,621 B2 * | 10/2019 | Purkis | E21B 34/08 |
| 10,480,283 B2 | 11/2019 | Joseph et al. | |
| 10,724,332 B2 | 7/2020 | Henschel, Jr. et al. | |
| 10,975,663 B2 * | 4/2021 | Kratochvil | E21B 34/142 |
| 11,248,718 B2 * | 2/2022 | Lake | E21B 34/066 |
| 11,713,987 B2 * | 8/2023 | Berntsen | E21B 47/10 |
| | | | 73/861.64 |
| 2002/0108747 A1 | 8/2002 | Dietz et al. | |
| 2003/0221616 A1 * | 12/2003 | Carpenter | C23C 16/45557 |
| | | | 118/715 |
| 2009/0206290 A1 | 8/2009 | Wygnanski | |
| 2010/0025045 A1 | 2/2010 | Lake et al. | |
| 2011/0000684 A1 | 1/2011 | Charles et al. | |
| 2011/0240299 A1 | 10/2011 | Vick, Jr. et al. | |
| 2012/0006563 A1 | 1/2012 | Patel et al. | |
| 2014/0060803 A1 | 3/2014 | Gano | |
| 2019/0203564 A1 | 7/2019 | Henschel, Jr. et al. | |
| 2020/0032616 A1 | 1/2020 | Vick, Jr. et al. | |
| 2020/0032628 A1 | 1/2020 | Orsini | |
| 2020/0248821 A1 * | 8/2020 | Parthasarathy | E21B 34/02 |
| 2020/0270965 A1 | 8/2020 | Vick, Jr. et al. | |
| 2020/0318458 A1 * | 10/2020 | Godfrey | E21B 23/03 |
| 2020/0386073 A1 * | 12/2020 | Joubran | E21B 34/08 |
| 2021/0095549 A1 | 4/2021 | Hern et al. | |
| 2021/0222522 A1 | 7/2021 | Greci et al. | |
| 2021/0246769 A1 * | 8/2021 | Burkart | G01M 3/2876 |
| 2022/0099214 A1 * | 3/2022 | Peever | F16K 31/086 |
| 2022/0178217 A1 * | 6/2022 | Egbe | E21B 17/06 |
| 2022/0220834 A1 | 7/2022 | Brown | E21B 23/03 |

FOREIGN PATENT DOCUMENTS

| | | | | |
|---|---|---|---|---|
| WO | 2015016859 A1 | 2/2015 | | |
| WO | 2020041056 A1 | 2/2020 | | |
| WO | WO-2022186696 A1 * | 9/2022 | | E21B 34/06 |

* cited by examiner

US 11,851,961 B1

MAGNETICALLY COUPLED SUBSURFACE CHOKE

BACKGROUND

Subsurface chokes are well known in the oil and gas industry and provide one of many mechanisms for limiting the amount subsurface production fluids that travel through the tubing string to the surface of the wellbore. Typically, chokes comprise a portion of a tubing string, the entirety of the choke being set in place during completion of a wellbore. What is needed in the art is an improved choke that does not encounter the problems of existing chokes.

BRIEF DESCRIPTION

Reference is now made to the following descriptions taken in conjunction with the accompanying drawings, in which.

Figure 9:
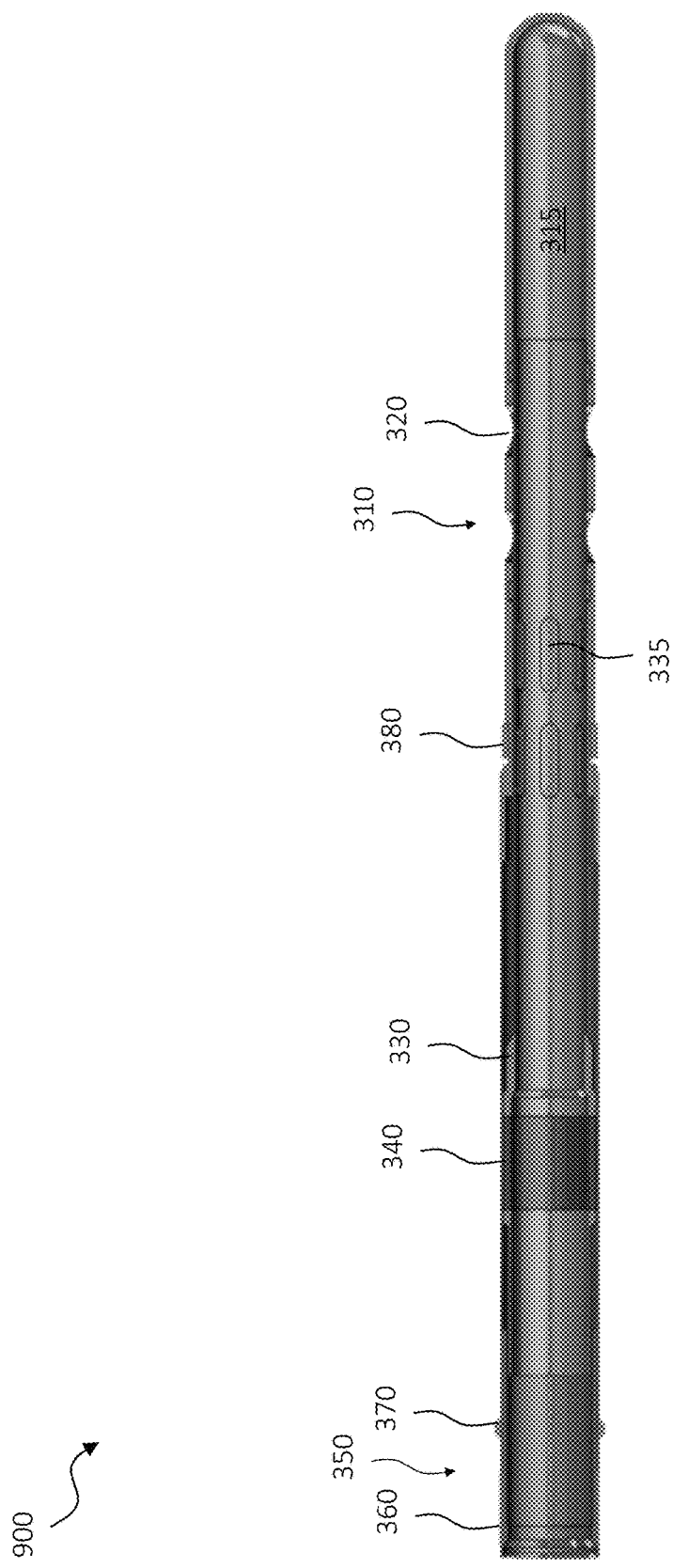

FIG. 9 illustrates one embodiment of a retrievable choke insert, as might form part of a choke (e.g., choke of FIG. 1), designed and manufactured according to an alternative embodiment of the present disclosure; and FIGS. 10A through 10J illustrate an embodiment for assembling (e.g., completing downhole) and operating a choke according to an alternative embodiment of the present disclosure, including inserting and locking a retrievable choke insert within a choke landing nipple.

DETAILED DESCRIPTION

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

The present disclosure has acknowledged that offshore wells are being drilled at ever increasing water depths and in environmentally sensitive waters, and thus chokes (e.g., including subsurface chokes are necessary. The present disclosure has further acknowledged that chokes have inherent problems. For instance, the present disclosure has recognized that the operational lifespan of traditional chokes is less than optimal, whether they completely quit working or alternatively begin to leak. In such situations where the chokes completely stop working or alternatively begin to leak, the tubing string that the chokes are coupled to must be pulled out of hole, coupled to a new working choke, and then returned within the wellbore, which is an expensive and time consuming process.

Based, at least in part, on the foregoing acknowledgments and recognitions, the present disclosure has developed a replaceable choke (e.g., tubing string independent replaceable choke). The replaceable choke, in at least one embodiment, may be run in hole in two or more steps. For example, a choke landing nipple of the replaceable choke may first be run in hole with the tubing string, and then a retrievable choke insert may be run in hole (e.g., in either a single trip or two trips), and ultimately engage with the choke landing nipple to complete the replaceable choke. Accordingly, if the replaceable choke were to quit working or alternatively begin to leak, the original retrievable choke insert could easily be removed and replaced with a replacement retrievable choke insert. The process of switching original retrievable choke insert with the replacement retrievable choke insert is a much less expensive and much less time consuming process (e.g., can eliminate the need for a workover unit) than is currently necessary when pulling the tubing string, as discussed above.

Chokes according to the disclosure may include hydraulic and/or electric actuation, among others. For example, in at least one embodiment, the hydraulic and/or electric actuation moves a first magnet (e.g., to compress a power spring in an isolated chamber in the choke landing nipple). As the first magnet is magnetically coupled to a second magnet associated with a bore flow management actuator (e.g., flow tube) of the retrievable choke insert, the hydraulic and/or electric actuation can be used to slide the bore flow management actuator to determine a flow condition of subsurface production fluids through the choke.

Chokes according to the disclosure may also have increased failsafe ability as compared to other chokes. Failsafe may be defined as a condition in which the choke or associated control system may be damaged and the choke retains the ability to close. In some examples, the choke may fail in a closed position (e.g., closed state), thus ensuring that wellbore fluids and pressure are contained. In another example, the choke may fail while in an open position (e.g., flow state), but closes automatically (e.g., using a power spring, the actuator or a second actuator) when a hydraulic and/or electrical connection to the surface is damaged or severed without any additional external input.

Figure 1:
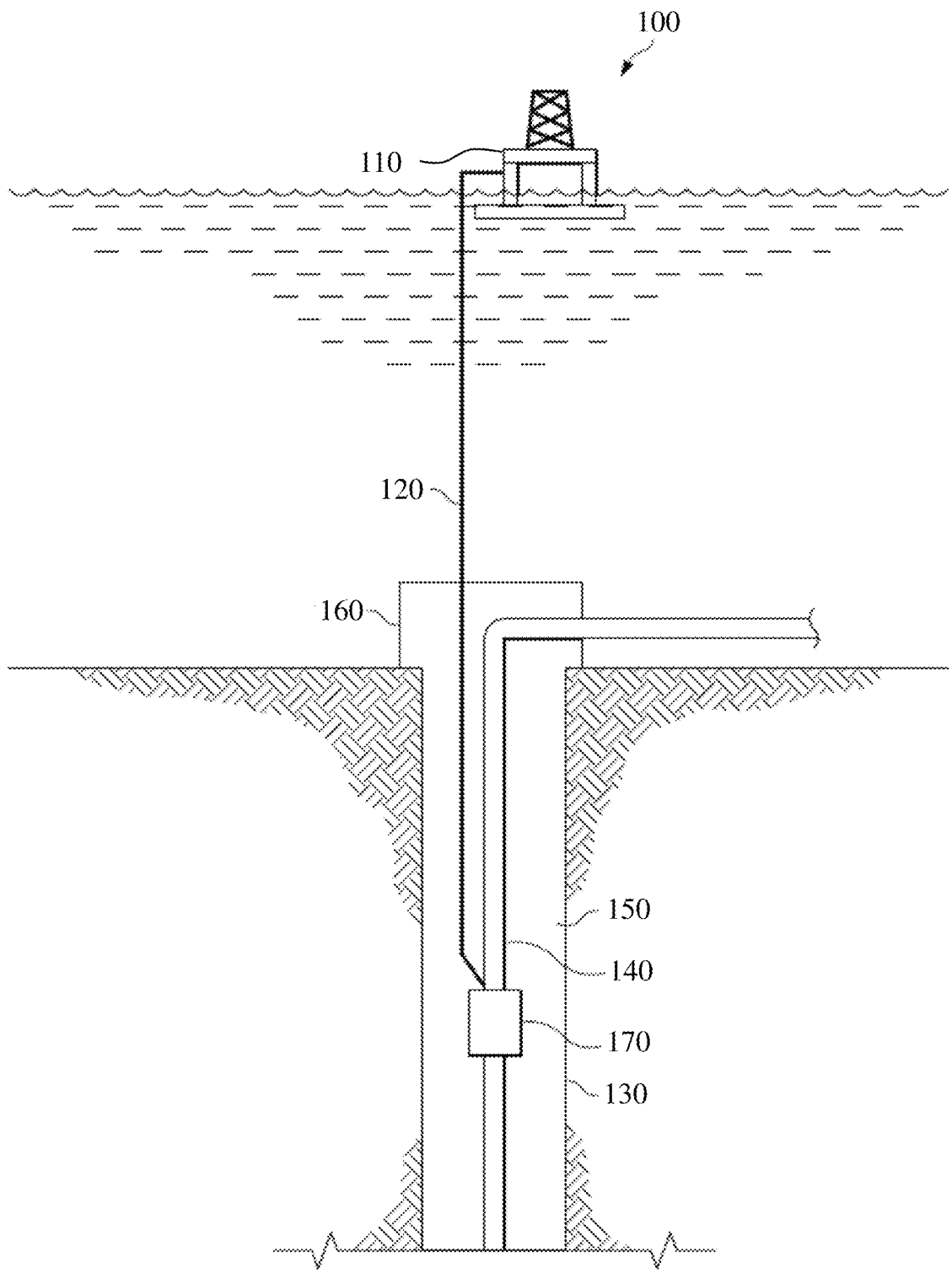
FIG. 1 illustrates a well system designed, manufactured and/or operated according to one or more embodiments of the disclosure.

FIG. 1 illustrates a well system 100 designed, manufactured and/or operated according to one or more embodiments of the disclosure. The well system 100, in at least one embodiment, includes an offshore platform 110 connected to a choke 170 via a control line 120 (e.g., hydraulic control line, electrical control line, etc.). An annulus 150 may be defined between walls of a wellbore 130 and a conduit 140. A wellhead 160 may provide a means to hand off and seal conduit 140 against the wellbore 130 and provide a profile to latch a subsea blowout preventer to. Conduit 140 may be coupled to the wellhead 160. Conduit 140 may be any conduit such as a casing, liner, production tubing, or other oilfield tubulars disposed in a wellbore.

The choke 170, or at least a portion thereof, may be interconnected in conduit 140 and positioned in the wellbore 130. Although the well system 100 is depicted in FIG. 1 as an offshore well system, one of ordinary skill should be able to adopt the teachings herein to any type of well, including onshore or offshore. The control line 120 may extend into the wellbore 130 and may be connected to the choke 170. The control line 120 may provide actuation power to the choke 170. As will be described in further detail below, power may be provided to the choke 170 to actuate or de-actuate the choke 170. Actuation may comprise opening the choke 170 to provide a flow path for subsurface production fluids to flow through conduit 140, and de-actuation may comprise closing the choke 170 to close a flow path for subsurface production fluids to flow through conduit 140. While the embodiment of FIG. 1 illustrates only a single choke 170, other embodiments exist wherein multiple chokes 170 according to the disclosure are used. Moreover, while not shown in the embodiment of FIG. 1, a tubing retrievable surface valve (TRSV) may be positioned downhole of the choke 170.

Figure 2:
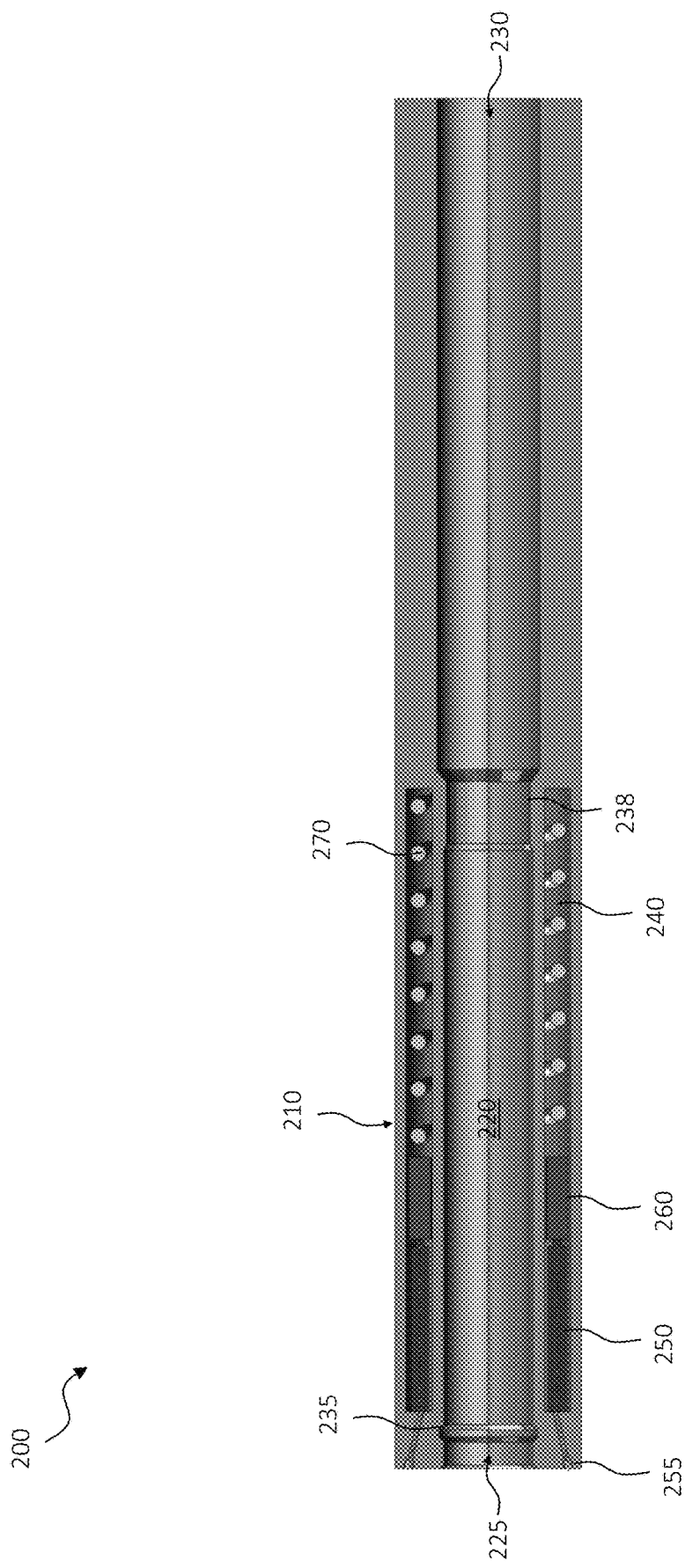
FIG. 2 illustrates one embodiment of a choke landing nipple, as might form part of a choke (e.g., choke of FIG. 1), designed and manufactured according to the present disclosure.

Turning now to FIG. 2, illustrated is one embodiment of a choke landing nipple 200, as might form part of a choke (e.g., choke 170 of FIG. 1), designed and manufactured according to the present disclosure. The choke landing nipple 200, in at least one embodiment, may be an integral part of a tubing retrievable choke, or in an alternative embodiment the choke landing nipple can be an independent device in the tubing string. The choke landing nipple 200, in at least one embodiment, includes a housing 210. The housing 210, in the illustrated embodiment, includes a passageway 220 extending from a first end 225 (e.g., uphole end) to a second end 230 (e.g., downhole end) thereof. While note shown in the embodiment of FIG. 2, the first and second ends 225, 230 may include coupling features (e.g., threaded coupling features), such that the choke landing nipple 200 may be coupled between adjacent ones of oilfield tubing (e.g., threaded tubing, production tubing, etc.).

In at least one embodiment, the choke landing nipple 200 further includes a latch profile 235 located in the passageway 220. The latch profile 235, in at least one embodiment, is a specifically designed latch profile configured to engage with a latch of a retrievable choke insert (e.g., the retrievable choke insert 300 of FIG. 3). In the illustrated embodiment, the latch profile 235 is located proximate the first end 225 (e.g., more near the first end 225 than near the second end 230). In at least one other embodiment, the choke landing nipple 200 further includes a polished bore receptacle 238. The polished bore receptacle 238, in at least one embodiment, is specifically configured to engage with a seal of a retrievable choke insert (e.g., the retrievable choke insert 300 of FIG. 3). In the illustrated embodiment, the polished bore receptacle 238 is located proximate the second end 230 (e.g., more near the second end 230 than near the first end 225).

The choke landing nipple 200 of FIG. 2, in at least one embodiment, additionally includes an isolated chamber 240. The isolated chamber 240, in the illustrated embodiment, is located in a sidewall of the housing 210 and is isolated from annulus and subsurface production fluids. In the illustrated embodiment of FIG. 2, an actuator 250 is positioned within the isolated chamber 240, and may be coupled to a control line (not shown) via one or more ports 255 in the housing 210. The actuator 250, in at least one embodiment, is a hydraulic actuator, and thus could be coupled to a hydraulic control line (e.g., hydraulic control line extending to the surface of the wellbore) via the one or more ports 255 in the housing. In yet another embodiment, the actuator 250 is an electric actuator, and thus could be coupled to an electric control line (e.g., TEC line extending to the surface of the wellbore) via the one or more ports 255 in the housing 210.

In the embodiment of FIG. 2, the choke landing nipple 200 additionally includes one or more landing nipple magnets 260 located within the isolated chamber 240, and coupled to the actuator 250. For example, movement of the actuator 250 between a first actuator state (e.g., unactuated state) and a second actuator state (e.g., actuated state) may be used to slide the one or more landing nipple magnets 260 between a first landing nipple magnet state (e.g., as shown in FIG. 2) and a second landing nipple magnet state (not shown), or anywhere therebetween (e.g., based upon the design). In at least one embodiment, the one or more landing nipple magnets 260 are permanent rare earth magnets. In yet another embodiment, however, the one or more landing nipple magnets 260 are electromagnets.

In the embodiment of FIG. 2, the choke landing nipple 200 additionally includes a power spring 270 located within the isolated chamber 240, and coupled (e.g., either directly or indirectly) to the one or more landing nipple magnets 260. The power spring 270, in at least one embodiment, is configured to return the one or more landing nipple magnets 260 from the second landing nipple magnet state to the first landing nipple magnet state when the actuator 250 is not powered. For example, if the power (e.g., hydraulic and/or electric power) to the actuator 250 were to be intentionally removed or reduced, the power spring 270 could move (e.g., whether independently or in conjunction with the actuator 250) the one or more landing nipple magnets 260 from the second landing nipple magnet state to the first landing nipple magnet state. Similarly, if the power (e.g., hydraulic and/or electric power) to the actuator 250 were to be unintentionally cut, the power spring 270 would act as a failsafe and move (e.g., independently) the one or more landing nipple magnets 260 from the second landing nipple magnet state to the first landing nipple magnet state.

Figure 3:
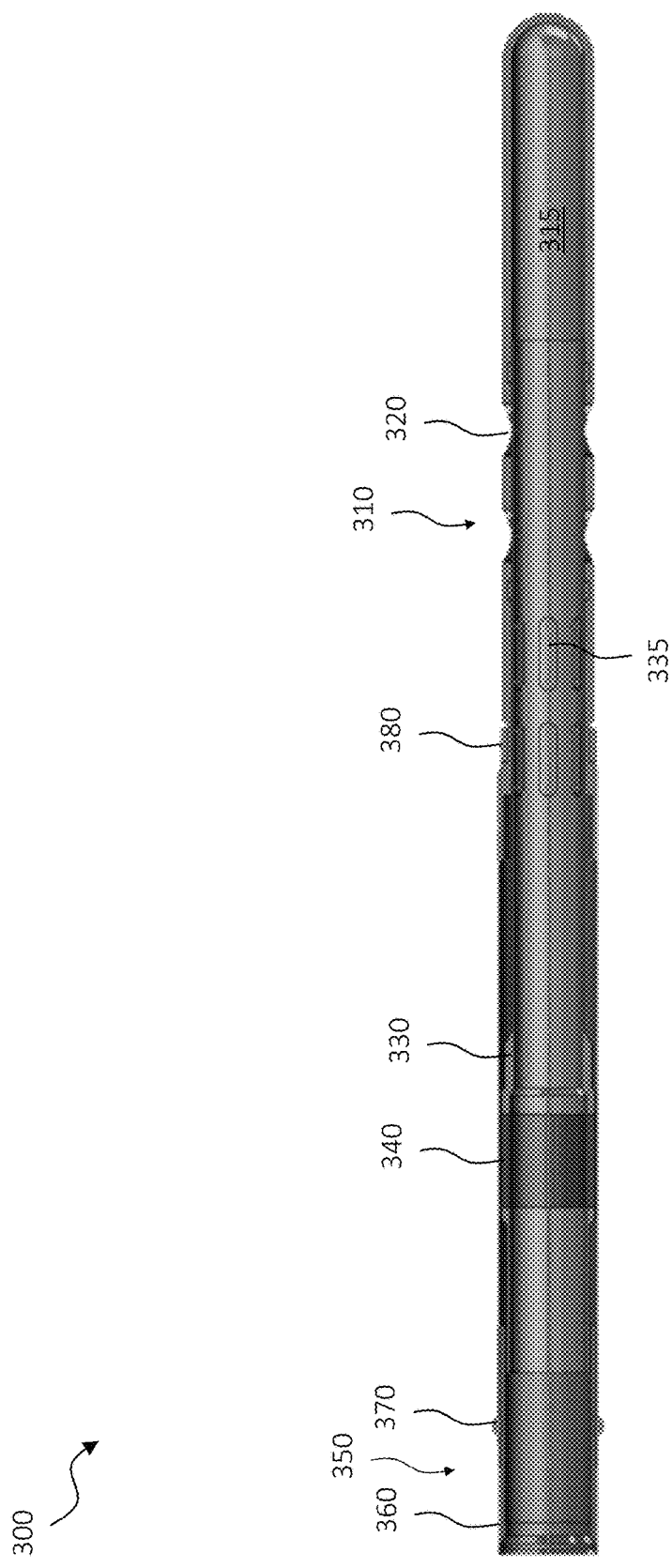
FIG. 3 illustrates one embodiment of a retrievable choke insert, as might form part of a choke (e.g., choke of FIG. 1), designed and manufactured according to the present disclosure.

Turning now to FIG. 3, illustrated is one embodiment of a retrievable choke insert 300, as might form part of a choke (e.g., choke 170 of FIG. 1), designed and manufactured according to the present disclosure. The retrievable choke insert 300, in at least one embodiment, could work in conjunction with a choke landing nipple (e.g., the choke landing nipple 200 of FIG. 2) to form a choke. The retrievable choke insert 300, in at least one embodiment, includes an outer housing 310. The outer housing 310, in one or more embodiments, comprises a central bore 315 extending axially therethrough, the central bore 315 operable to convey subsurface production fluids. The outer housing 310 may additionally include an open end and a closed end, as well as one or more outer housing openings 320 extending through a sidewall thickness thereof. In the illustrated embodiment, the outer housing 310 includes two or more outer housing openings 320. Nevertheless, the number of outer housing openings 320 may be chosen based upon the degree of control of the amount of the subsurface production fluid entering the bore flow management actuator. For instance, the higher the number of outer housing openings 320, the greater the degree of control. Moreover, the control may be finite control, or alternatively could be infinite control.

The retrievable choke insert 300 of the embodiment of FIG. 3 may additionally include a bore flow management actuator 330 disposed in the central bore 315. The bore flow management actuator 330, in at least one embodiment, includes one or more bore flow management openings 335 extending through a bore flow management actuator sidewall thickness. In the illustrated embodiment, the bore flow management actuator 330 includes two or more bore flow management openings 335. Nevertheless, the number of bore flow management openings 335 may be chosen based upon the degree of control of the amount of the subsurface production fluid entering the bore flow management actuator. For instance, the higher the number of bore flow management openings 335, the greater the degree of control. Moreover, the control may again be finite control, or alternatively could be infinite control.

The bore flow management actuator 330, in the illustrated embodiment, is configured to move between a fully closed state, a fully open state, and depending on the design many states (e.g., finite and infinite states) therebetween. For example, when the bore flow management actuator 330 is in a fully closed state, the bore flow management openings 335 are fully misaligned (e.g., either axially or rotationally) with the one or more bore flow management openings 320. In contrast, when the bore flow management actuator 330 is in the fully open state, the bore flow management openings 335 are fully aligned with the one or more bore flow management openings 320, and thus allows all the subsurface production fluids to access the bore flow management actuator 330, and thus allows the subsurface production fluids to exit the wellbore. In other embodiments, the bore flow actuator 330 is partially open/closed, such that the bore flow management openings 335 are partially aligned/misaligned with the one or more bore flow management openings 320. The bore flow management actuator 330 may comprise many different features and remain within the scope of the disclosure. Nevertheless, in at least on embodiment, the bore flow management actuator 330 comprises a flow tube.

In accordance with the disclosure, the retrievable choke insert 300 may additionally include one or more choke insert magnets 340. For example, the one or more choke insert magnets 340 may be coupled to (e.g., integrated with) the bore flow management actuator 330. Accordingly, when the one or more choke insert magnets 340 move, the bore flow management actuator 330 moves. In at least one embodiment, the bore flow management actuator 330 moves in lock step with the one or more choke inert magnets 340, for example to partially or fully align or misalign the bore flow management openings 335 with the one or more bore flow management openings 320.

In at least one embodiment, the one or more choke insert magnets 340 are configured to magnetically couple with one or more landing nipple magnets of the choke landing nipple (e.g., the one or more landing nipple magnets 260 of the choke landing nipple 200 of FIG. 2). Thus, as the one or more landing nipple magnets of the choke landing nipple move between a first landing nipple magnet state and a second landing nipple magnet state, being magnetically coupled thereto, the one or more choke insert magnets 340 move between a first choke insert magnet state and a second choke insert magnet state. Accordingly, the movement of the one or more landing nipple magnets of the choke landing nipple between the first landing nipple magnet state and the second landing nipple magnet state ultimately moves the bore flow management actuator 330 between the closed state and flow state.

In accordance with the disclosure, the retrievable choke insert 300 may additionally include a landing nipple locking feature 350. The landing nipple locking feature 350, in one or more embodiments, is configured to engage (e.g., removably engage) with a choke landing nipple (e.g., the latch profile 235 of the choke landing nipple 200 of FIG. 2). Thus, when the landing nipple locking feature 350 of the retrievable choke insert 300 is engaged with the choke landing nipple (e.g., the latch profile 235 of the choke landing nipple 200 of FIG. 2), the choke is assembled, and thus may operate to allow or prevent subterranean production fluid from exiting the wellbore. Unique to the present disclosure, the landing nipple locking feature 350 may be moved (e.g., for example using wireline, slickline, coiled tubing, a wellbore tractor, etc.) between the engaged and disengaged state, and thus may allow the retrievable choke insert 300 to be easily insert within the choke landing nipple, easily removed from the choke landing nipple, or alternatively a replacement retrievable choke insert may be easily insert within the choke landing nipple, as discussed above.

The landing nipple locking feature 350, in one or more embodiments, includes a sliding sleeve 360, as well as one or more locking features 370. In the illustrated embodiment, the sliding sleeve 360 extends at least partially around, and may slide relative to, the bore flow management actuator 330. Furthermore, the locking features 370, in one or more embodiments, are movable from a radially retracted state to a radially extended state (e.g., extending through one or more openings in the outer housing 310). For example, in at least one embodiment, as the sliding sleeve slides relative to the bore flow management actuator 330, the sliding sleeve 360 engages a radially interior surface of the locking feature 370 to move the locking feature from the radially retracted state to the radially extended state. When the retrievable choke insert 300 is appropriately positioned within a choke landing nipple (e.g., the choke landing nipple 200 of FIG. 2), the movement of the sliding sleeve 360 moves the locking feature 370 from the radially retracted state to the radially extended state engaged with a latch profile (e.g., the latch profile 235 of FIG. 2) in the choke landing nipple. In the illustrated embodiment, the landing nipple locking feature 350 extends within, and in certain embodiments forms a portion of the outer housing 310 and/or bore flow management actuator 330. Other embodiments exist, however, where the landing nipple locking feature 350 does not extend within or form a portion of the outer housing 310 and/or bore flow management actuator 330. For example, the landing nipple locking feature 350, in certain embodiments, forms a separate distinct feature from the bore flow management actuator 330.

In accordance with the disclosure, the retrievable choke insert 300 may additionally include one or more seals 380. In at least one embodiment, the one or more seals 380 are one or more stacked seals that engage with a surface of the choke landing nipple. In at least one other embodiment, the one or more seals 380 are one or more stacked seals that engage with a polished bore receptacle (e.g., polished bore receptacle 238 of FIG. 2) of the choke landing nipple. In yet other embodiments, the one or more seals 380 are thermoplastic, elastomeric, or metal-to-metal seals, among others.

Turning now to FIGS. 4A through 4J, illustrated is an embodiment for assembling (e.g., completing downhole) and operating a choke 400 according to one or more embodiments of the disclosure, including inserting and locking a retrievable choke insert 420a within a choke landing nipple 410. In the illustrated embodiment of FIGS. 4A through 4J, the choke landing nipple 410 is similar in many respects to the choke landing nipple 200 of FIG. 2, and thus like reference numbers have been used to indicate similar, if not identical, features. Similarly, in the illustrated embodiment of FIGS. 4A through 4J, the retrievable choke insert 420a is similar in many respects to the retrievable choke insert 300 of FIG. 3, and thus like reference numbers have been used to indicate similar, if not identical, features. While not illustrated, the choke landing nipple 410 might be interconnected between pairs of oilfield tubulars, for example between pairs of threaded joint tubing. Furthermore, while not shown, a downhole conveyance, such as wireline, slickline, coiled tubing, a wellbore tractor, etc. may be coupled to the retrievable choke insert 420a for placing, securing and retrieving the retrievable choke insert 420a within/from the choke landing nipple 410.

Figure 4A:
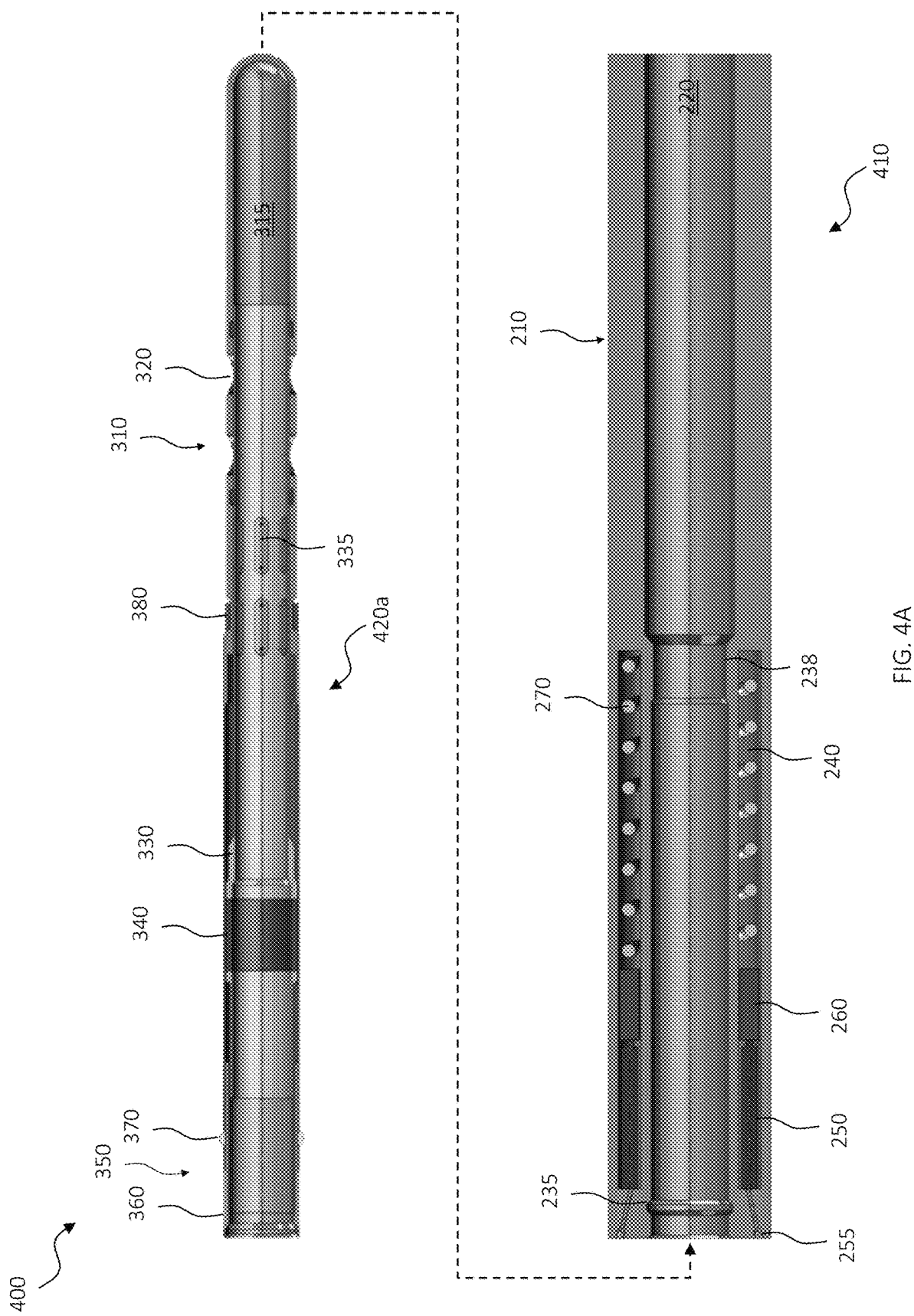
FIGS. 4A through 4J illustrate an embodiment for assembling (e.g., completing downhole) and operating a choke according to one or more embodiments of the disclosure, including inserting and locking a retrievable choke insert within a choke landing nipple.

Referring to FIG. 4A, the choke landing nipple 410 and the retrievable choke insert 420a are separate from one another, for example as they might be positioned as the retrievable choke insert 420a were travelling down the wellbore toward the choke landing nipple 410. As shown in the embodiment of FIG. 4A, the actuator 250 of the choke landing nipple 410 is in a first actuator state. As further shown in the embodiment of FIG. 4A, the bore flow management actuator 330 is in a fully closed state, such that the bore flow management openings 335 are fully misaligned (e.g., either axially or rotationally) with the one or more bore flow management openings 320. Furthermore, the one or more locking features 370 of the retrievable choke insert 420a may be in the radially retracted state, as the sliding sleeve 360 has yet to slide to move the one or more locking features 370 to the radially extended state.

Figure 4B:
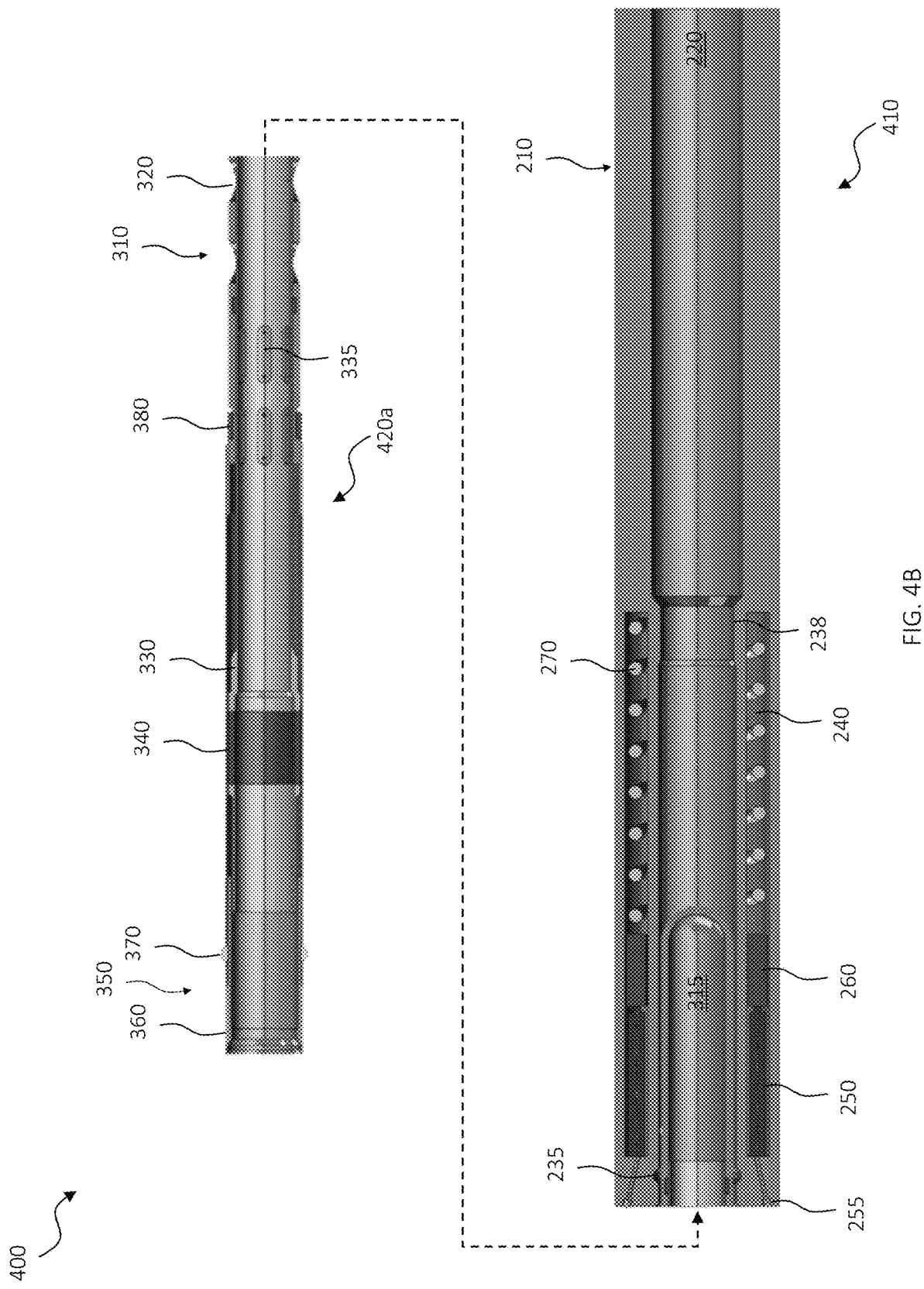

Referring to FIG. 4B, illustrated is the choke 400 of FIG. 4A after a small portion of the retrievable choke insert 420a has entered the choke landing nipple 410. In the embodiment of FIG. 4B, a downhole end of the retrievable choke insert 420a is approaching the one or more landing nipple magnets 260. The choke landing nipple 410 and the retrievable choke insert 420a are in substantially the same operational configuration in FIG. 4B as they were in FIG. 4A, but for the small portion of the retrievable choke insert 420a having entered the choke landing nipple 410.

Figure 4C:
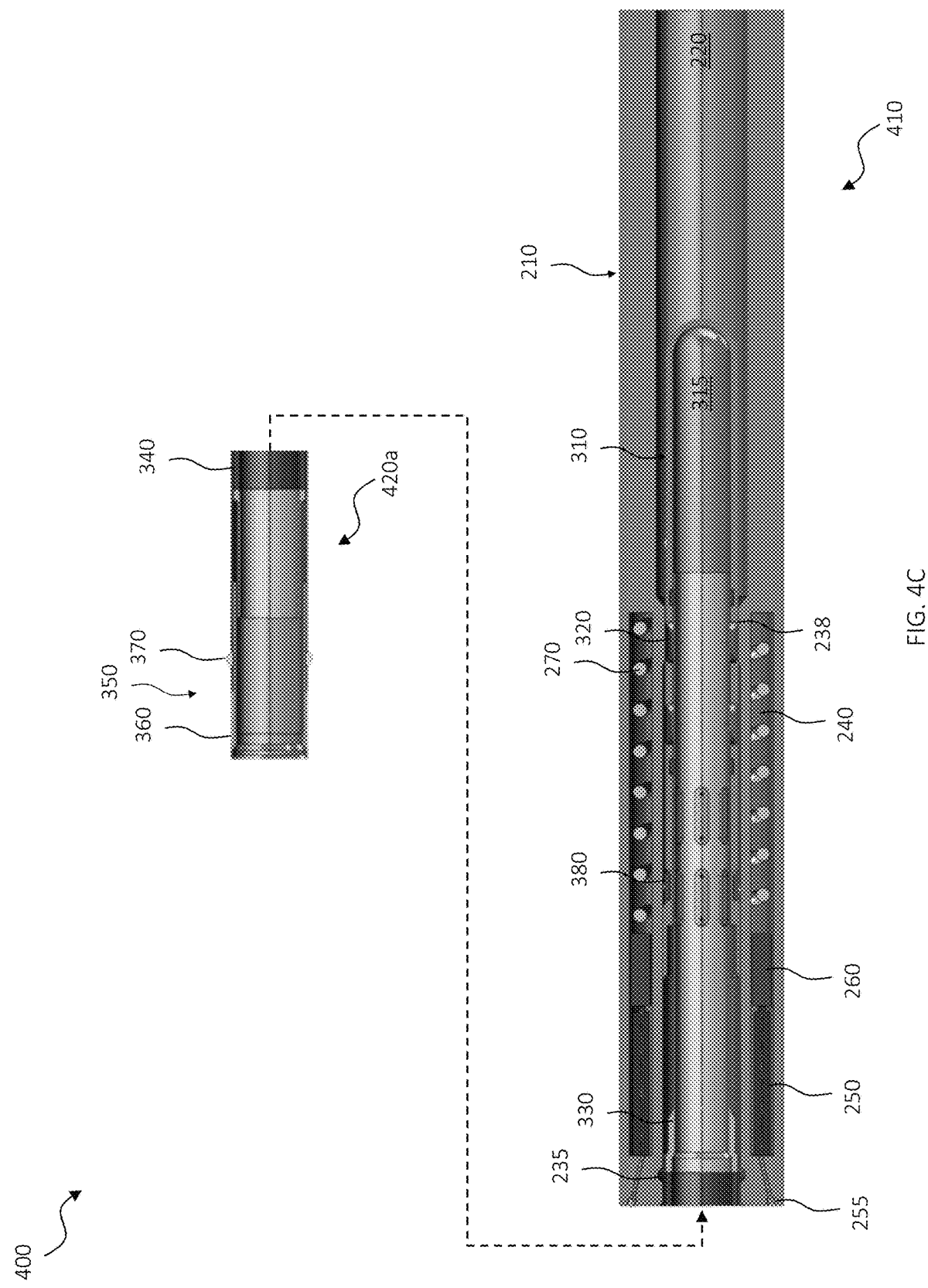

Referring to FIG. 4C, illustrated is the choke 400 of FIG. 4B after a significant portion of the retrievable choke insert 420a has entered the choke landing nipple 410. In the embodiment of FIG. 4C, a downhole end of the retrievable choke insert 420a has extended past the polished bore receptacle 238. The choke landing nipple 410 and the retrievable choke insert 420a are in substantially the same operational configuration in FIG. 4C as they were in FIG. 4B, but for the significant portion of the retrievable choke insert 420a having entered the choke landing nipple 410.

Figure 4D:
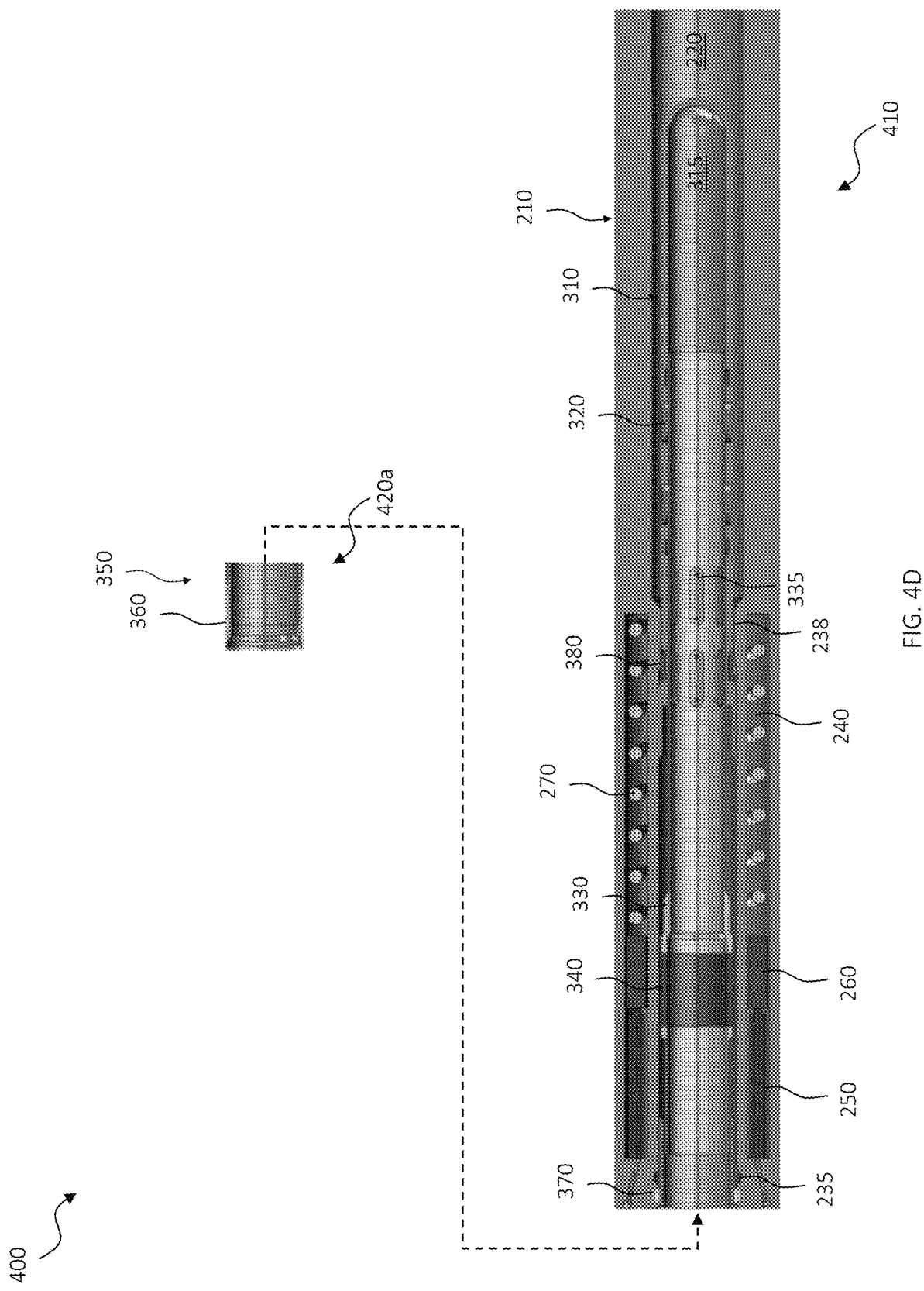

Referring to FIG. 4D, illustrated is the choke 400 of FIG. 4C after almost all of the retrievable choke insert 420a has entered the choke landing nipple 410. In the embodiment of FIG. 4D, the locking feature 370 is approaching the latch profile 235. The choke landing nipple 410 and the retrievable choke insert 420a are in substantially the same operational configuration in FIG. 4D as they were in FIG. 4C, but for almost all of the retrievable choke insert 420a having entered the choke landing nipple 410.

Figure 4E:
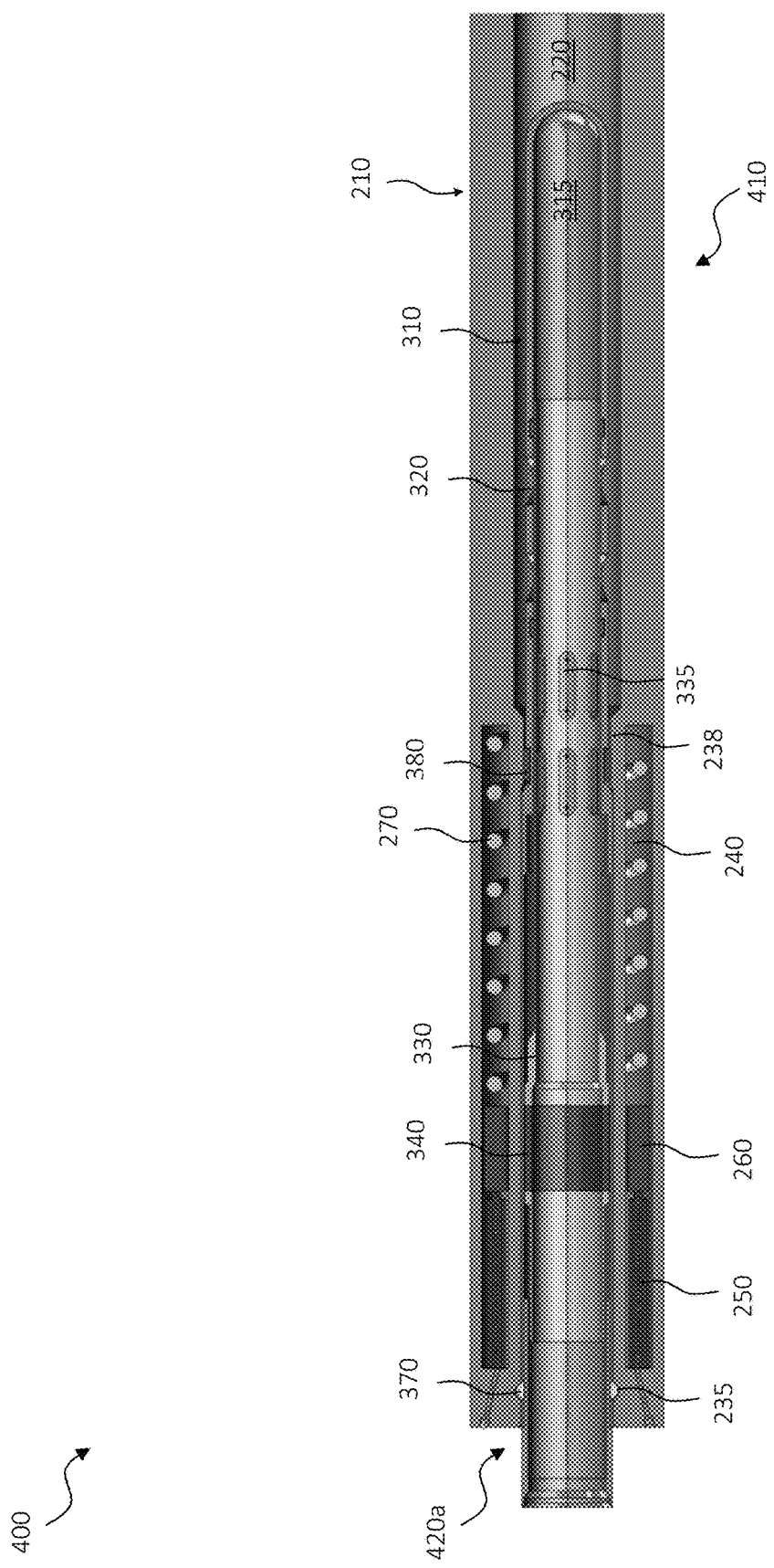

Referring to FIG. 4E, illustrated is the choke 400 of FIG. 4D after the locking feature 370 is located under the latch profile 235, and the sliding sleeve 360 has slid down moving the locking feature 370 from the radially retracted state to the radially extended state. Accordingly, the locking feature 370 now engages with the latch profile 235. Furthermore, the one or more choke insert magnets 340 are now magnetically coupled to the one or more landing nipple magnets 260. Additionally, the one or more seals 380 are in sealing engagement with the polished bore receptacle 238. Accordingly, the choke 400 is now assembled and operational.

Figure 4F:
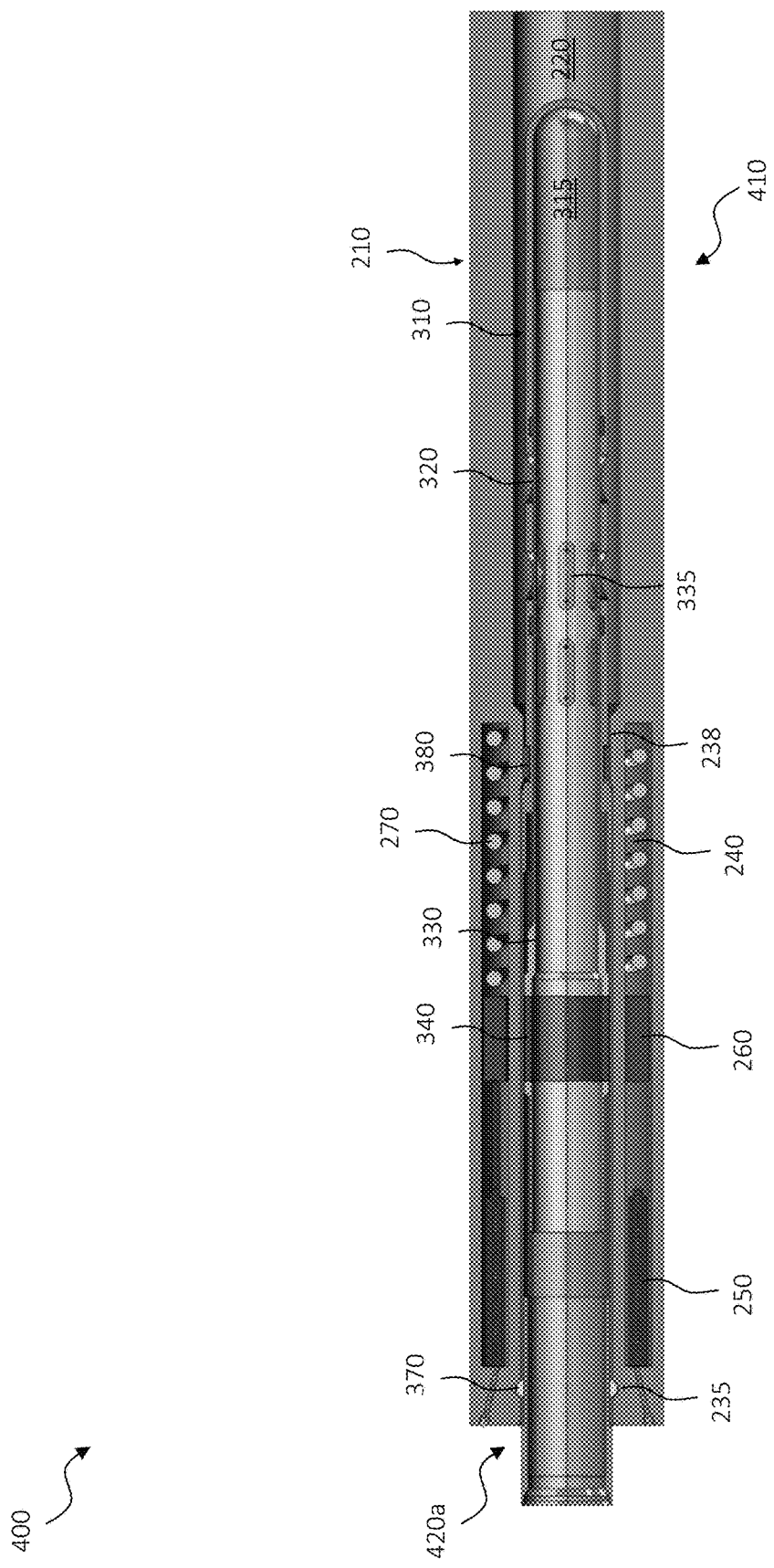

Referring to FIG. 4F, illustrated is the choke 400 of FIG. 4E after the actuator 250 has moved from the first actuator state to a second actuator state. In doing so, the actuator 250 has moved the one or more landing nipple magnets 260 from the first landing nipple magnet state to a second landing nipple magnet state. Moreover, as the one or more choke insert magnets 340 are magnetically coupled to the one or more landing nipple magnets 260, the one or more choke insert magnets 340 move from the first choke insert magnet state to a second choke insert magnet state. Additionally, as the bore flow management actuator 330 is coupled to the one or more choke insert magnets 340, the bore flow management actuator 330 moves from the first state to a second state, the second state allowing subterranean production fluid to travel through the choke 400. In the illustrated embodiment of FIG. 4F, the bore flow management actuator 330 is in the partially open/closed state (e.g., moving from the fully closed state of FIG. 4E), such that the bore flow management openings 335 are partially aligned/misaligned with the one or more bore flow management openings 320.

Figure 4G:
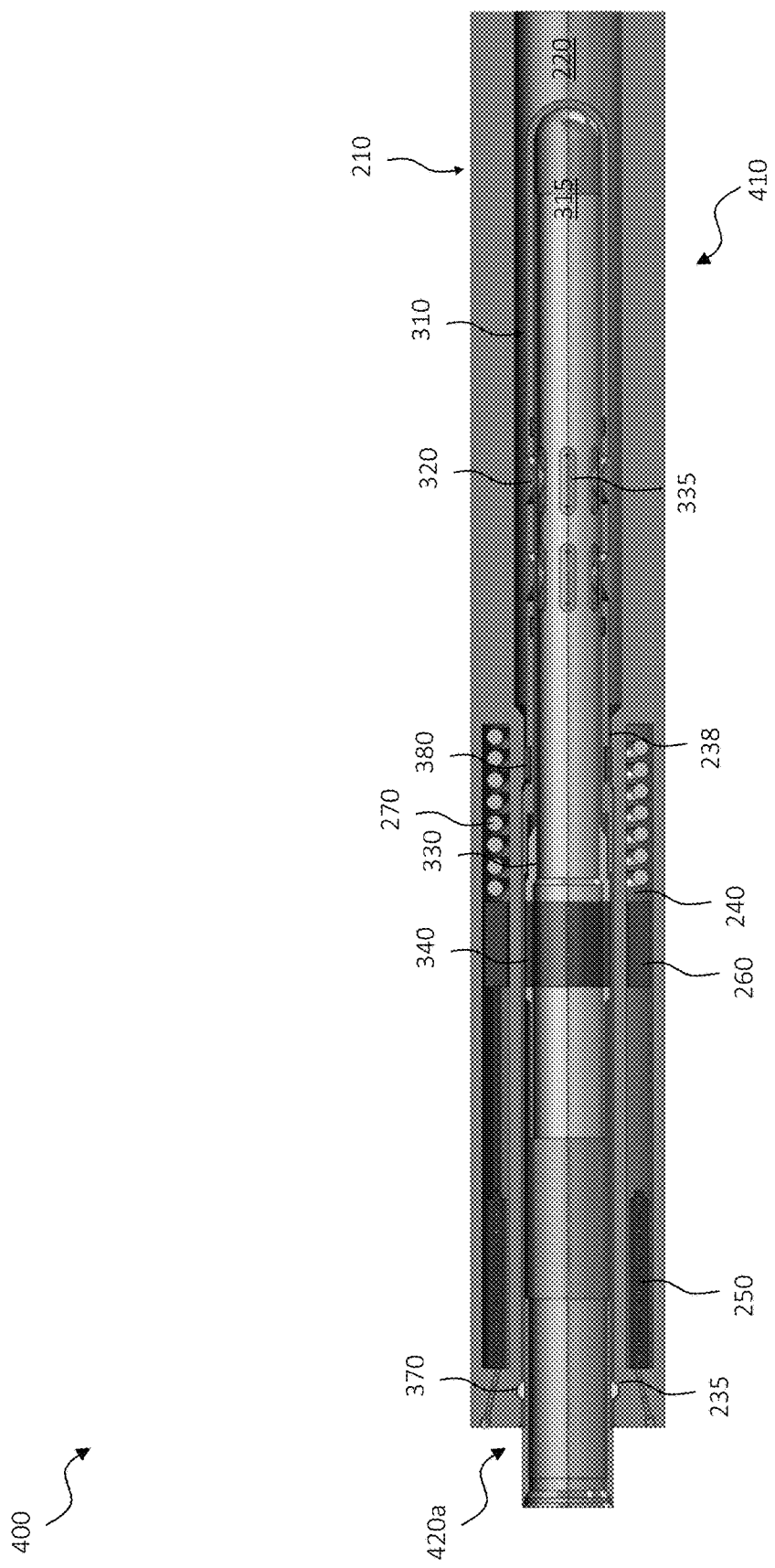

Referring to FIG. 4G, illustrated is the choke 400 of FIG. 4F after the actuator 250 has moved from the second actuator state to a third actuator state. In doing so, the actuator 250 has moved the one or more landing nipple magnets 260 from the second landing nipple magnet state to a third landing nipple magnet state. Moreover, as the one or more choke insert magnets 340 are magnetically coupled to the one or more landing nipple magnets 260, the one or more choke insert magnets 340 move from the second choke insert magnet state to a third choke insert magnet state. Additionally, as the bore flow management actuator 330 is coupled to the one or more choke insert magnets 340, the bore flow management actuator 330 moves from the second state to a third state, the third state continuing to allow subterranean production fluid to travel through the choke 400. In the illustrated embodiment of FIG. 4G, the bore flow management actuator 330 is in the fully open state (e.g., moving from the partially open/closed state of FIG. 4F), such that the bore flow management openings 335 are fully aligned with the one or more bore flow management openings 320. While the embodiments of FIGS. 4F and 4G illustrate but three different finite states, other embodiments exist wherein more or less than three finite states may be achieved, or in certain embodiments wherein the number of states is infinite.

Figure 4H:
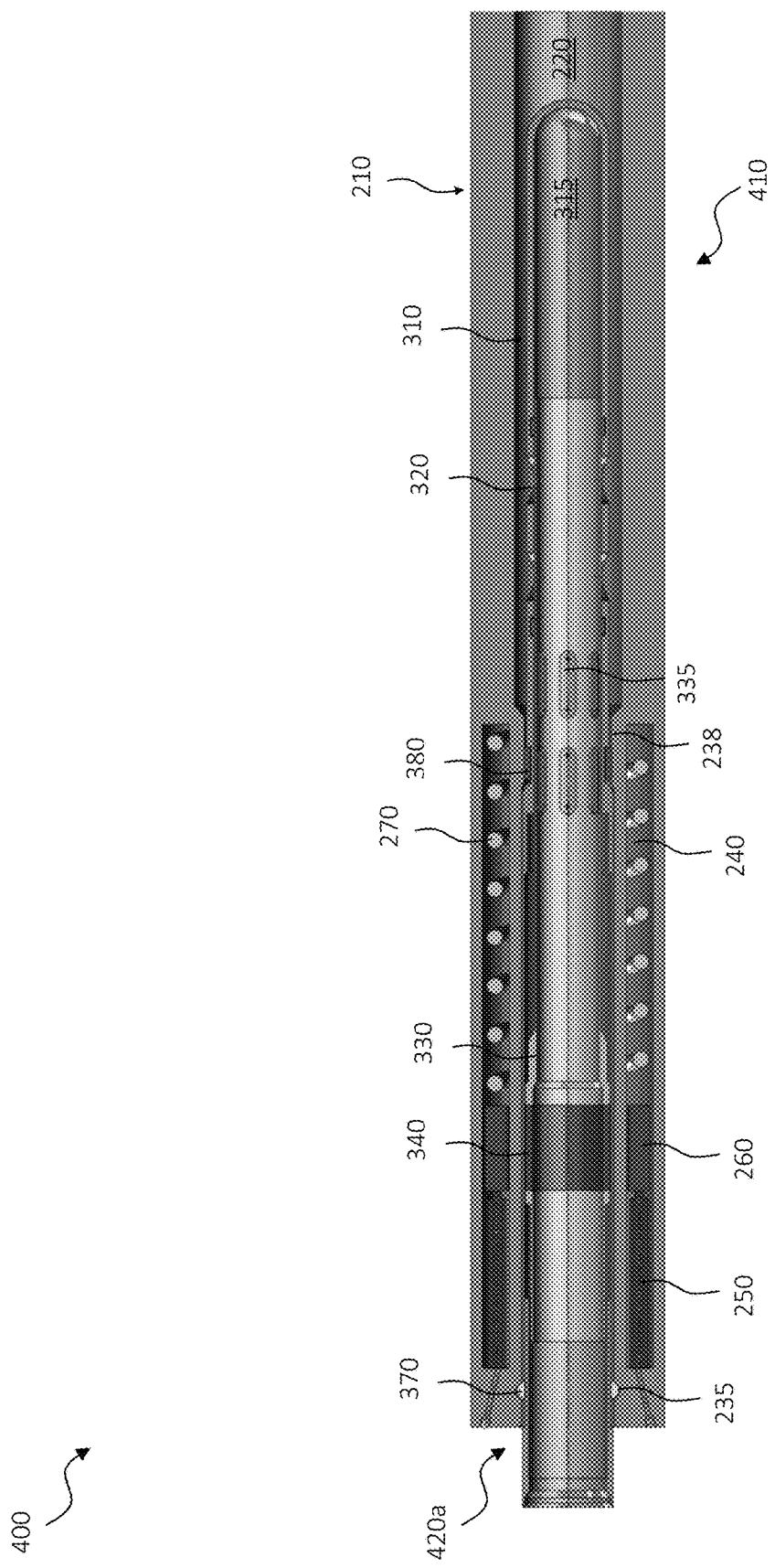

Referring to FIG. 4H, illustrated is the choke 400 of FIG. 4G after the actuator 250 has moved from the second actuator state or third actuator state back to the first actuator state. In doing so, the power spring 270 has moved the one or more landing nipple magnets 260 from the second landing nipple magnet state or third landing nipple magnet state back to the first landing nipple magnet state. Moreover, as the one or more choke insert magnets 340 are magnetically coupled to the one or more landing nipple magnets 260, the one or more choke insert magnets 340 move from the second choke insert magnet state or third choke insert magnet state back to the first choke insert magnet state. Additionally, as the bore flow management actuator 330 is coupled to the one or more choke insert magnets 340, the bore flow management actuator 330 moves from the fully open state or partially open/closed state back to the closed state, the closed state preventing subterranean production fluid from travelling through the choke 400.

In at least one embodiment, the power spring 270 is configured to return the one or more landing nipple magnets 260 from the second landing nipple magnet state or third landing nipple magnet state to the first landing nipple magnet state when the actuator 250 is not powered. For example, if the power (e.g., hydraulic and/or electric power) to the actuator 250 were to be intentionally removed or reduced, the power spring 270 could move (e.g., whether independently or in conjunction with the actuator 250) the one or more landing nipple magnets 260 from the second landing nipple magnet state or third landing nipple magnet state to the first landing nipple magnet state. Similarly, if the power (e.g., hydraulic and/or electric power) to the actuator 250 were to be unintentionally cut, the power spring 270 would act as a failsafe and move (e.g., independently) the one or more landing nipple magnets 260 from the second landing nipple magnet state or third landing nipple magnet state to the first landing nipple magnet state.

Figure 4I:
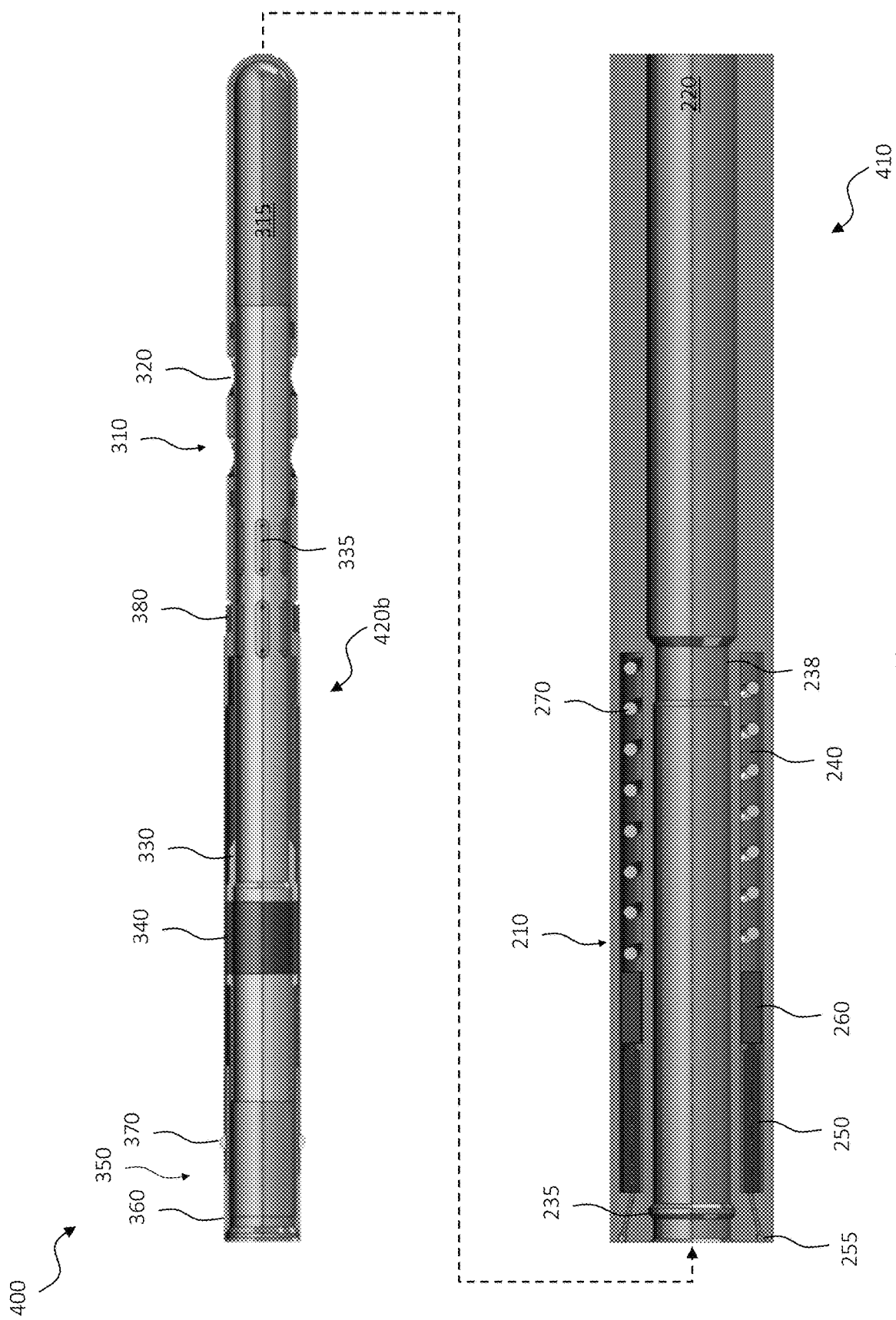

Referring to FIG. 4I, illustrated is the choke 400 of FIG. 4G after the retrievable choke insert 420a has been removed from the choke landing nipple 410, and a replacement retrievable choke insert 420b is being installed within the choke landing nipple 410. The replacement retrievable choke insert 420b is similar in many respects to the retrievable choke insert 420a. Accordingly, like reference numbers have been used to indicate similar, if not identical, features.

Figure 4J:
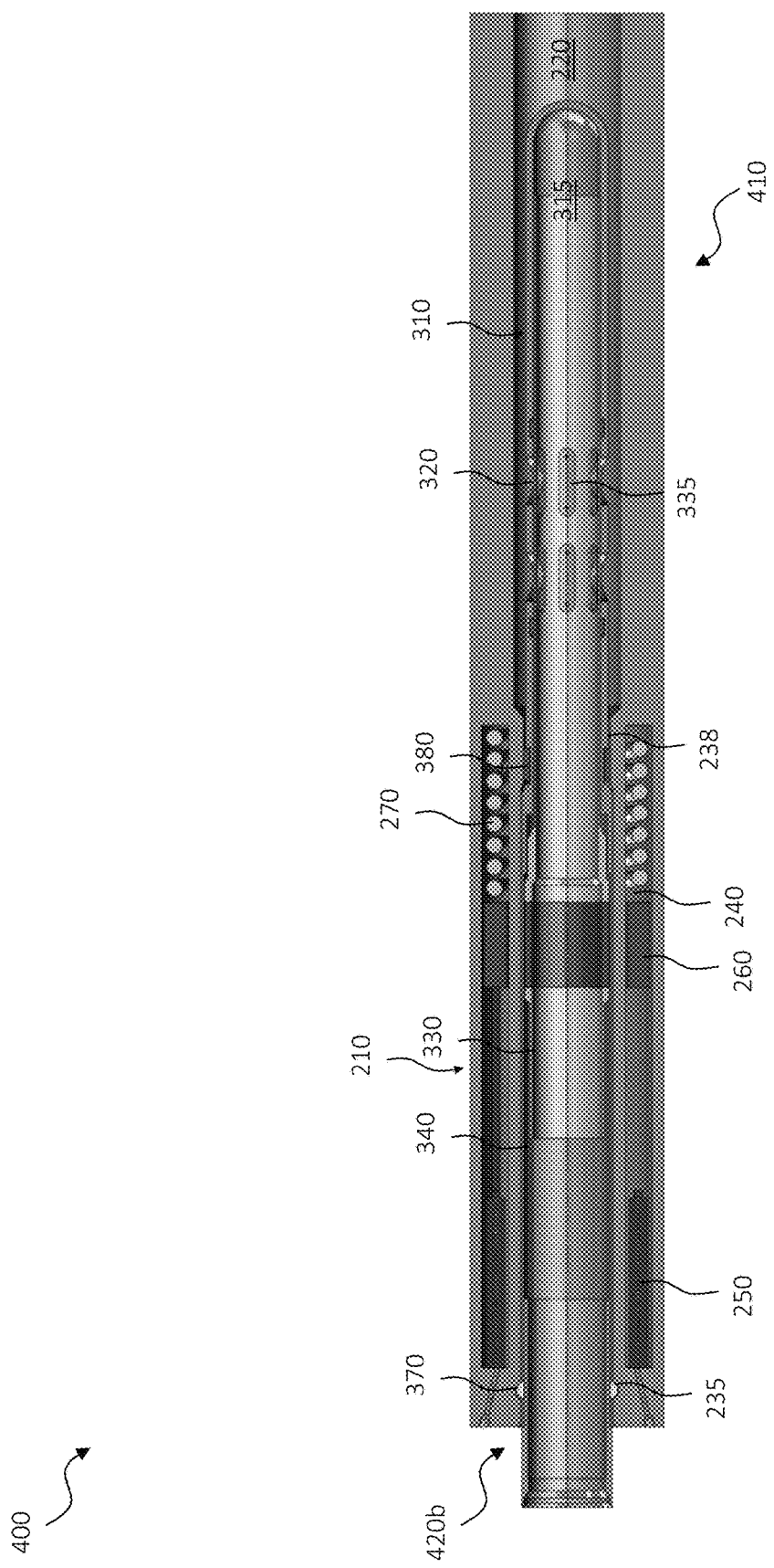

Referring to FIG. 4J, illustrated is the choke 400 of FIG. 4I after the replacement retrievable choke insert 420b is fully assembled within the choke landing nipple 410. Accordingly, the choke 400 is now assembled and operational with the replacement retrievable choke insert 420b.

Figure 5:
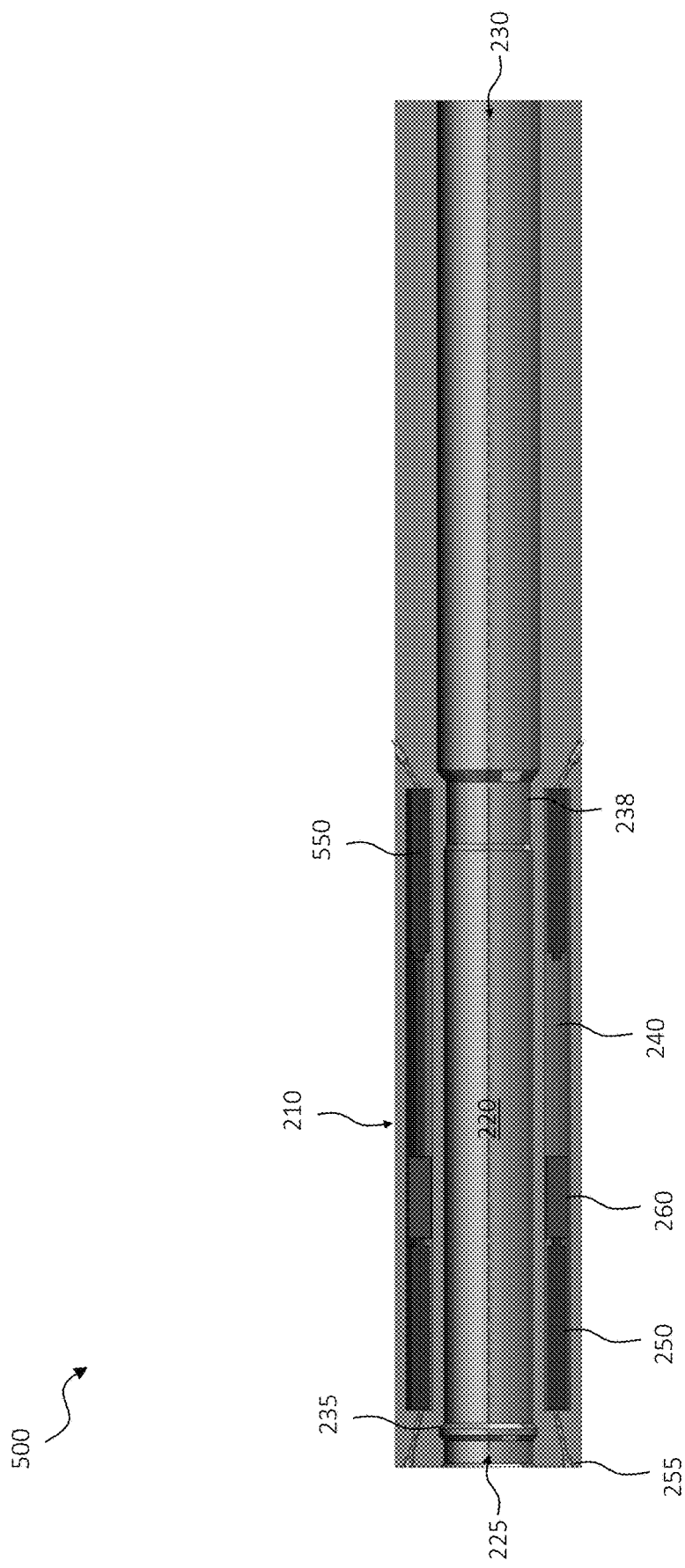
FIG. 5 illustrates one embodiment of a choke landing nipple, as might form part of a choke (e.g., choke of FIG. 1), designed and manufactured according to an alternative embodiment of the present disclosure.

Turning now to FIG. 5, illustrated is one embodiment of a choke landing nipple 500, as might form part of a choke (e.g., choke 170 of FIG. 1), designed and manufactured according to an alternative embodiment of the present disclosure. The choke landing nipple 500 is similar in many respects to the choke landing nipple 200 of FIG. 2. Accordingly, like reference numbers have been used to indicate similar, if not identical, features. The choke landing nipple 500 differs, for the most part, from the choke landing nipple 200, in that the choke landing nipple 500 includes a second actuator 550 located in the isolated chamber 240 and coupled to the one or more landing nipple magnets 260, the second actuator 550 configured to return the one or more landing nipple magnets 260 from the second landing nipple magnet state to the first landing nipple magnet state. In essence, wherein the first actuator 250 pushes the one or more landing nipple magnets 260 to the right (e.g., downhole), the second actuator 500 may return the one or more landing nipple magnets 260 to the left (e.g., uphole).

Figure 6:
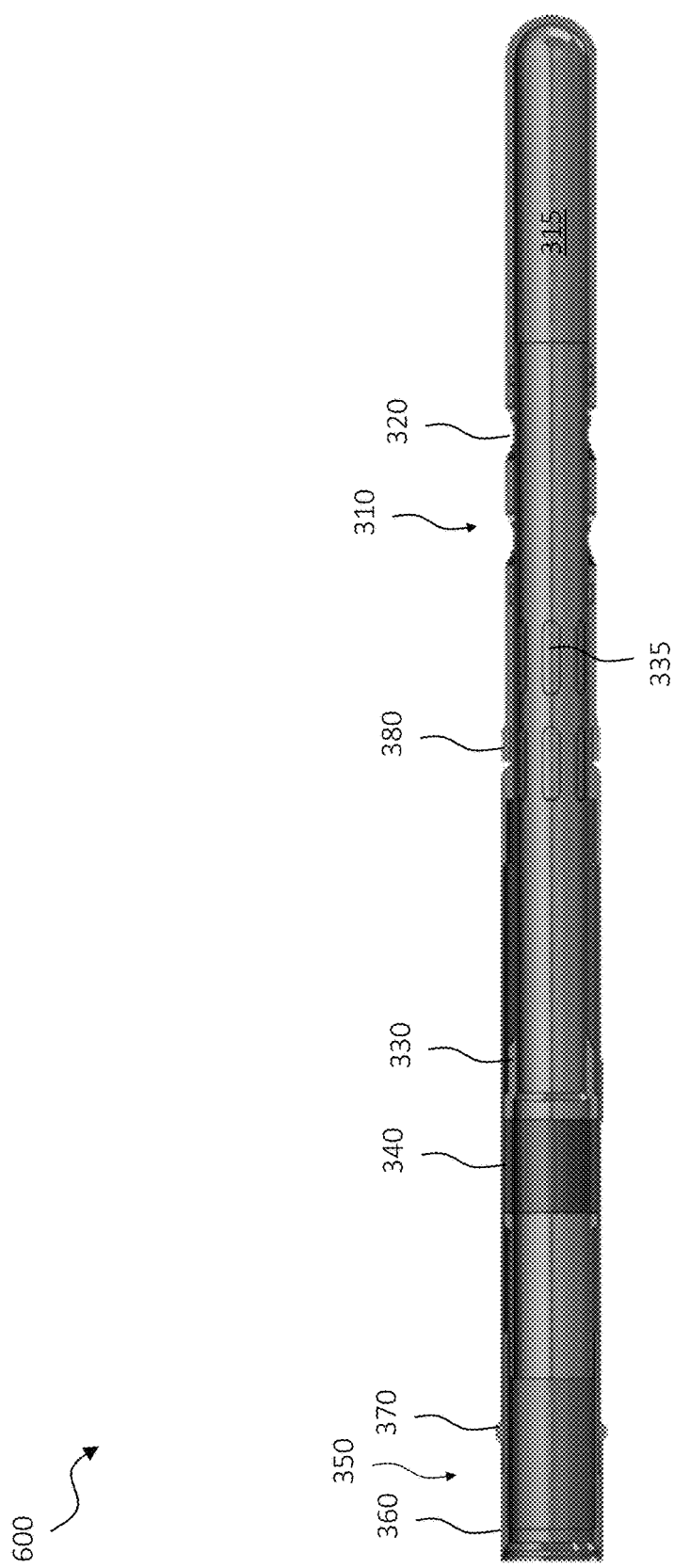
FIG. 6 illustrates one embodiment of a retrievable choke insert, as might form part of a choke (e.g., choke of FIG. 1), designed and manufactured according to an alternative embodiment of the present disclosure.

Turning now to FIG. 6, illustrated is one embodiment of a retrievable choke insert 600, as might form part of a choke (e.g., choke 170 of FIG. 1), designed and manufactured according to an alternative embodiment of the present disclosure. The retrievable choke insert 600 is similar in many respects to the retrievable choke insert 300 of FIG. 3. Accordingly, like reference numbers have been used to indicate similar, if not identical, features.

Turning now to FIGS. 7A through 7J, illustrated is an embodiment for assembling (e.g., completing downhole) and operating a choke 700 according to one or more embodiments of the disclosure, including inserting and locking a retrievable choke insert 720a within a choke landing nipple 710. In the illustrated embodiment of FIGS. 7A through 7J, the choke landing nipple 710 is similar in many respects to the choke landing nipple 500 of FIG. 5, and thus like reference numbers have been used to indicate similar, if not identical, features. Similarly, in the illustrated embodiment of FIGS. 7A through 7J, the retrievable choke insert 720a is similar in many respects to the retrievable choke insert 600 of FIG. 6, and thus like reference numbers have been used to indicate similar, if not identical, features. While not illustrated, the choke landing nipple 710 might be interconnected between pairs of oilfield tubulars, for example between pairs of threaded joint tubing. Furthermore, while not shown, a downhole conveyance, such as wireline, slickline, coiled tubing, a wellbore tractor, etc. may be coupled to the retrievable choke insert 720a for placing, securing and retrieving the retrievable choke insert 720a within/from the choke landing nipple 410.

Figure 7A:
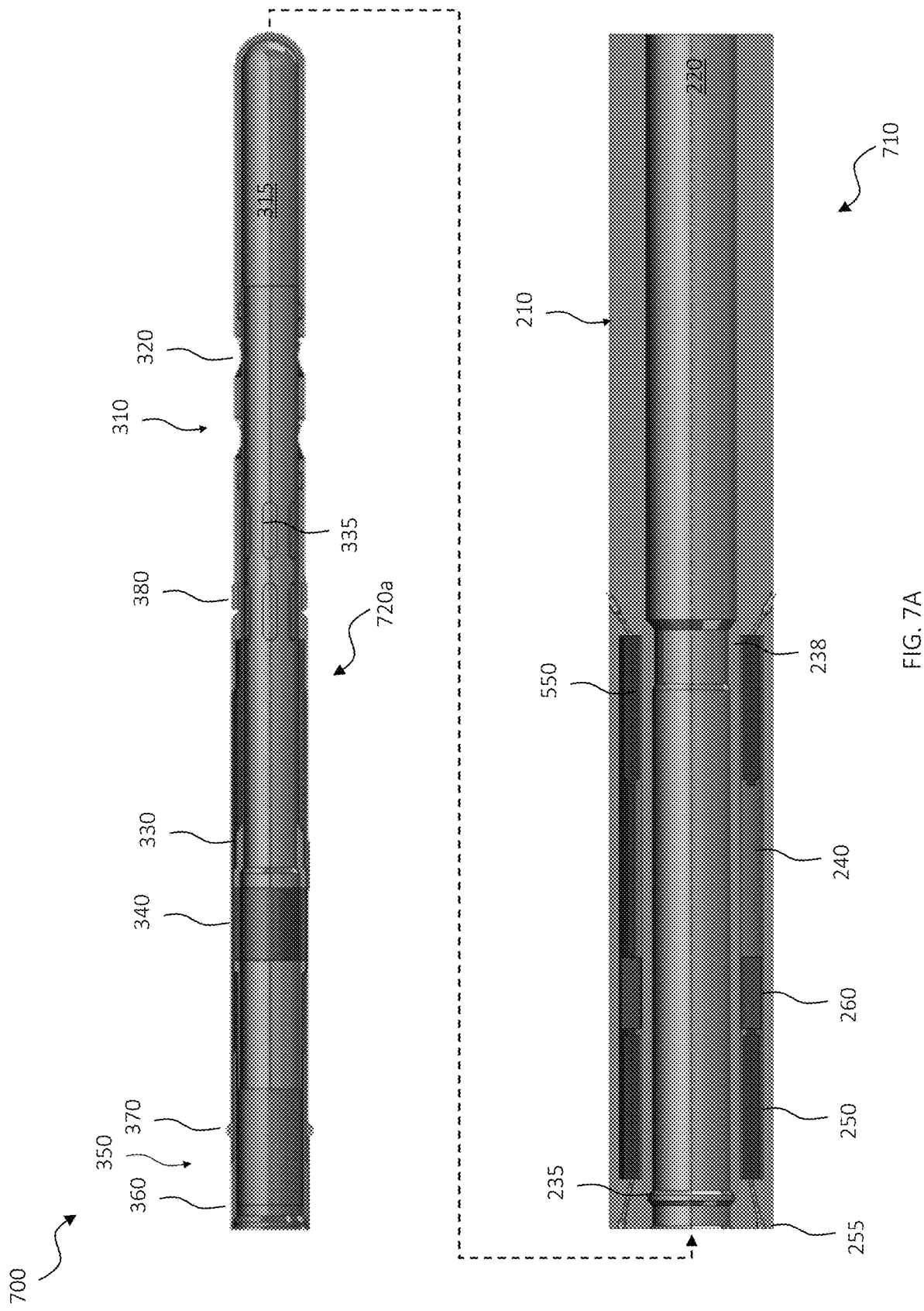
FIGS. 7A through 7J illustrate an embodiment for assembling (e.g., completing downhole) and operating a choke according to one or more alternative embodiments of the disclosure, including inserting and locking a retrievable choke insert within a choke landing nipple.

Referring to FIG. 7A, the choke landing nipple 710 and the retrievable choke insert 720a are separate from one another, for example as they might be positioned as the retrievable choke insert 720a were travelling down the wellbore toward the choke landing nipple 710. As shown in the embodiment of FIG. 7A, the actuator 250 of the choke landing nipple 710 is in a first actuator state. As further shown in the embodiment of FIG. 7A, the bore flow management actuator 330 is in a fully closed state, such that the bore flow management openings 335 are fully misaligned (e.g., either axially or rotationally) with the one or more bore flow management openings 320. Furthermore, the one or more locking features 370 of the retrievable choke insert 720a may be in the radially retracted state, as the sliding sleeve 360 has yet to slide to move the one or more locking features 370 to the radially extended state.

Figure 7B:
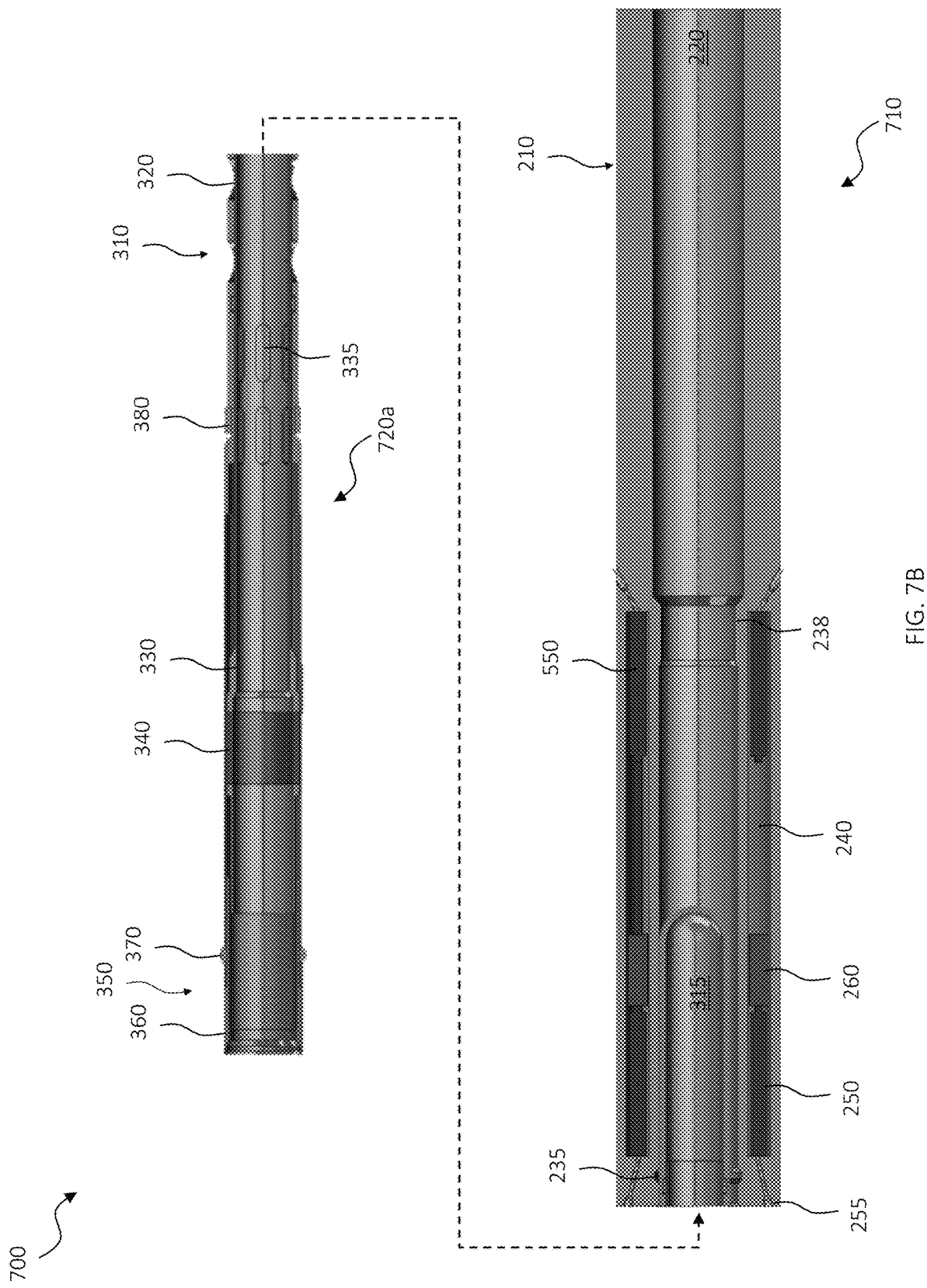

Referring to FIG. 7B, illustrated is the choke 700 of FIG. 7A after a small portion of the retrievable choke insert 720a has entered the choke landing nipple 710. In the embodiment of FIG. 7B, a downhole end of the retrievable choke insert 720a is approaching the one or more landing nipple magnets 260. The choke landing nipple 710 and the retrievable choke insert 720a are in substantially the same operational configuration in FIG. 7B as they were in FIG. 7A, but for the small portion of the retrievable choke insert 720a having entered the choke landing nipple 710.

Figure 7C:
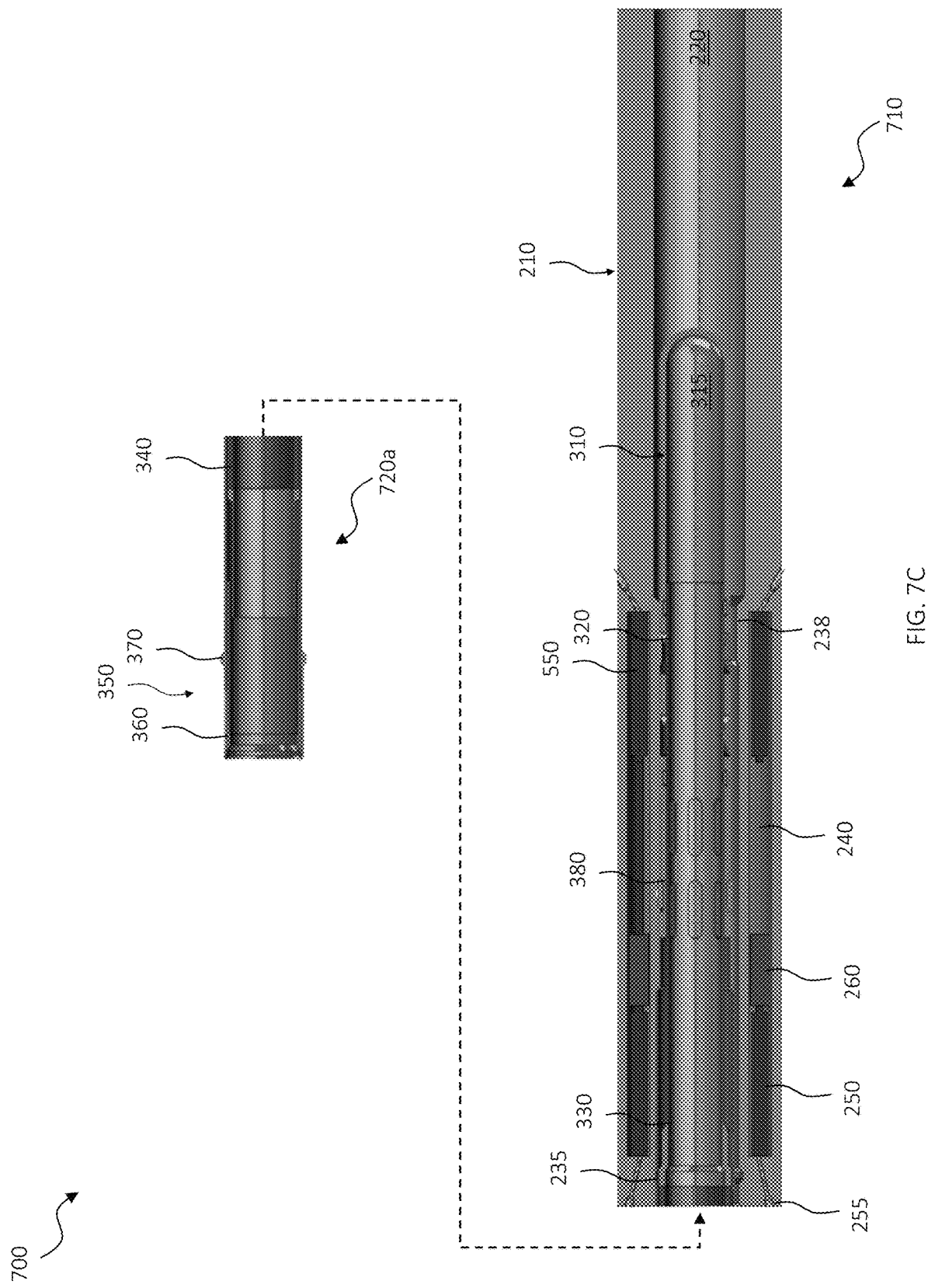

Referring to FIG. 7C, illustrated is the choke 700 of FIG. 7B after a significant portion of the retrievable choke insert 720a has entered the choke landing nipple 710. In the embodiment of FIG. 7C, a downhole end of the retrievable choke insert 720a has extended past the polished bore receptacle 238. The choke landing nipple 710 and the retrievable choke insert 720a are in substantially the same operational configuration in FIG. 7C as they were in FIG. 7B, but for the significant portion of the retrievable choke insert 720a having entered the choke landing nipple 710.

Figure 7D:
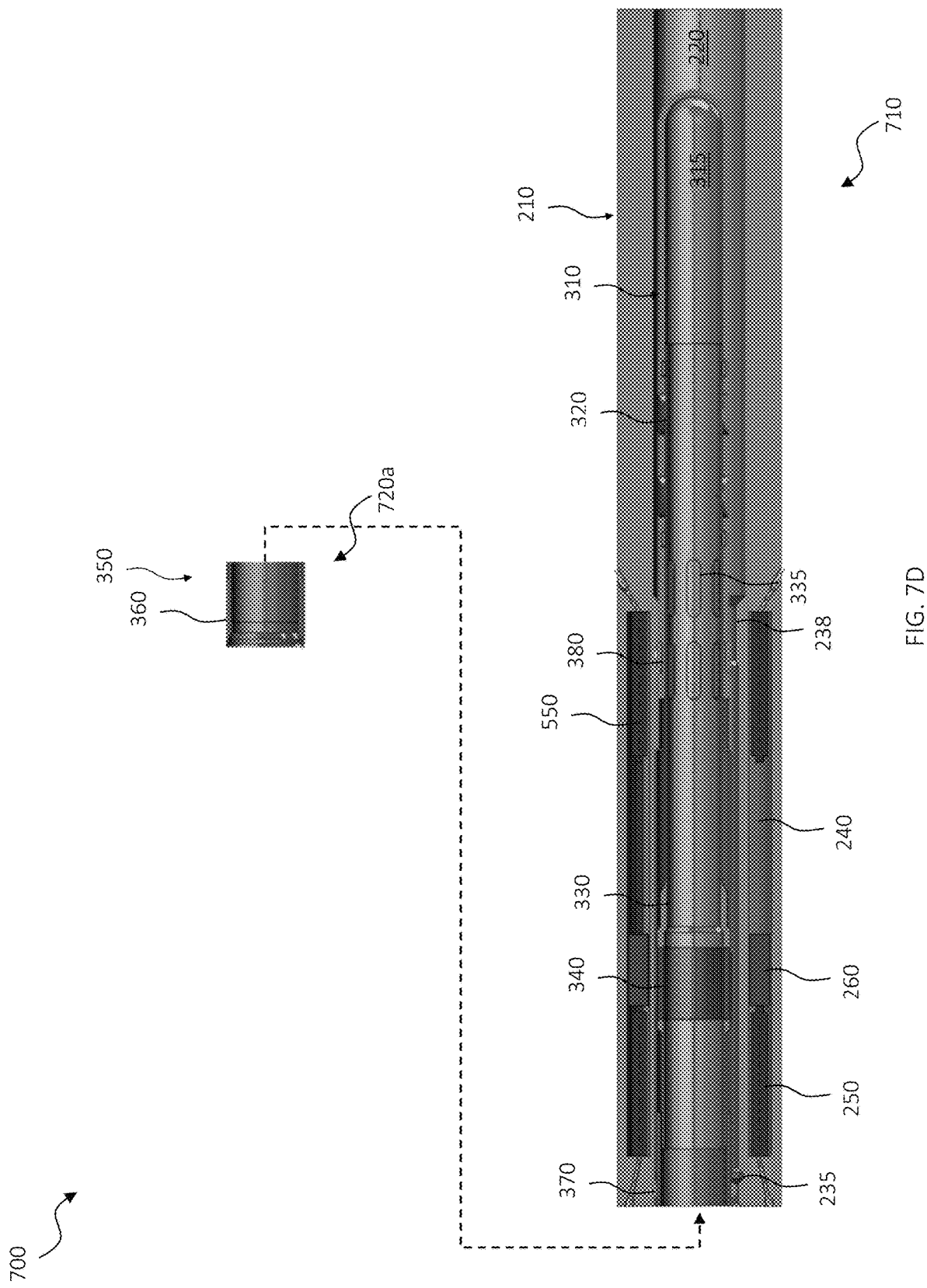

Referring to FIG. 7D, illustrated is the choke 700 of FIG. 7C after almost all of the retrievable choke insert 720a has entered the choke landing nipple 710. In the embodiment of FIG. 7D, the locking feature 370 is approaching the latch profile 235. The choke landing nipple 710 and the retrievable choke insert 720a are in substantially the same operational configuration in FIG. 7D as they were in FIG. 7C, but for almost all of the retrievable choke insert 720a having entered the choke landing nipple 710.

Figure 7E:
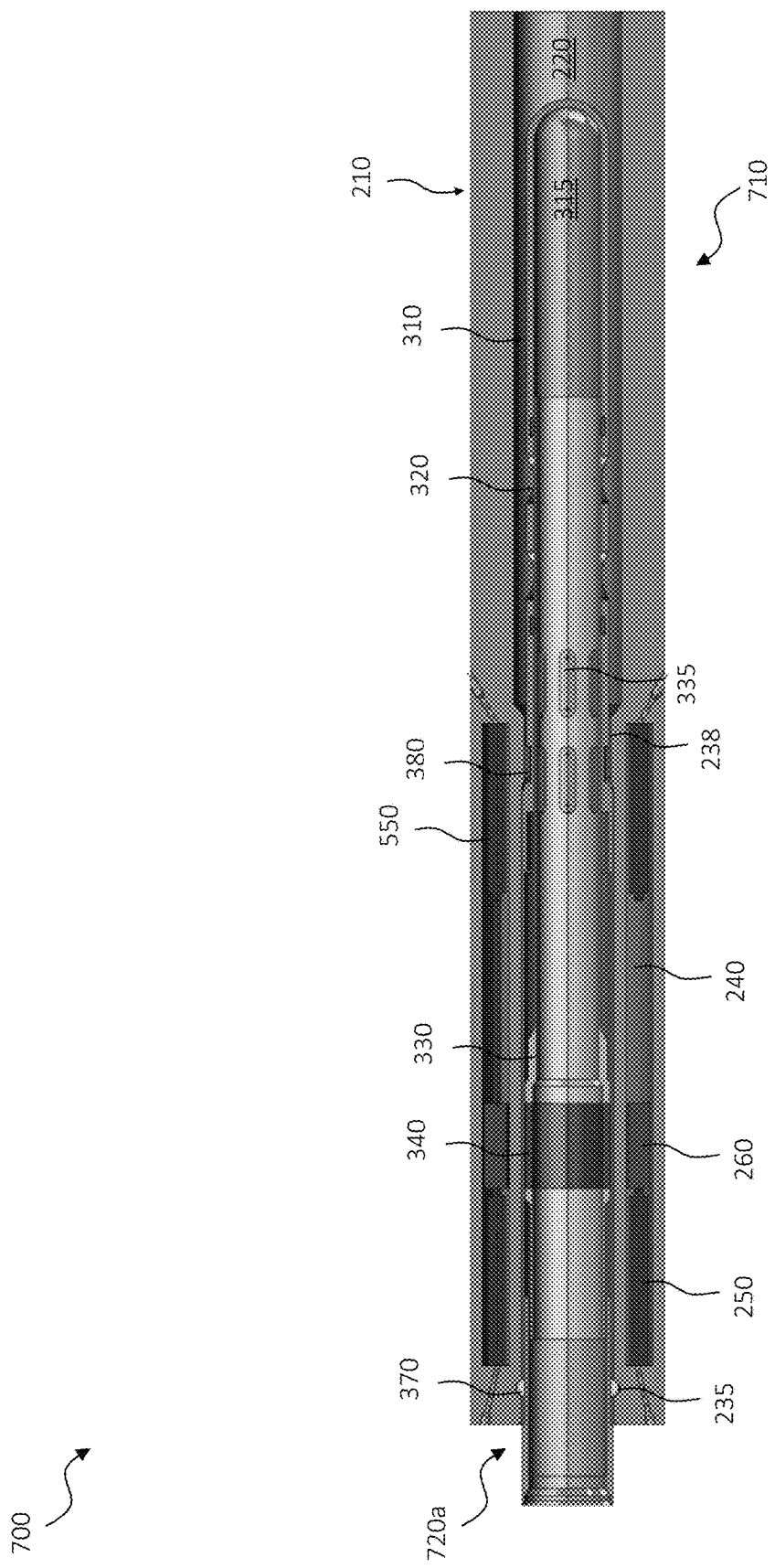

Referring to FIG. 7E, illustrated is the choke 700 of FIG. 7D after the locking feature 370 is located under the latch profile 235, and the sliding sleeve 360 has slid down moving the locking feature 370 from the radially retracted state to the radially extended state. Accordingly, the locking feature 370 now engages with the latch profile 235. Furthermore, the one or more choke insert magnets 340 are now magnetically coupled to the one or more landing nipple magnets 260. Additionally, the one or more seals 380 are in sealing engagement with the polished bore receptacle 238. Accordingly, the choke 700 is now assembled and operational.

Figure 7F:
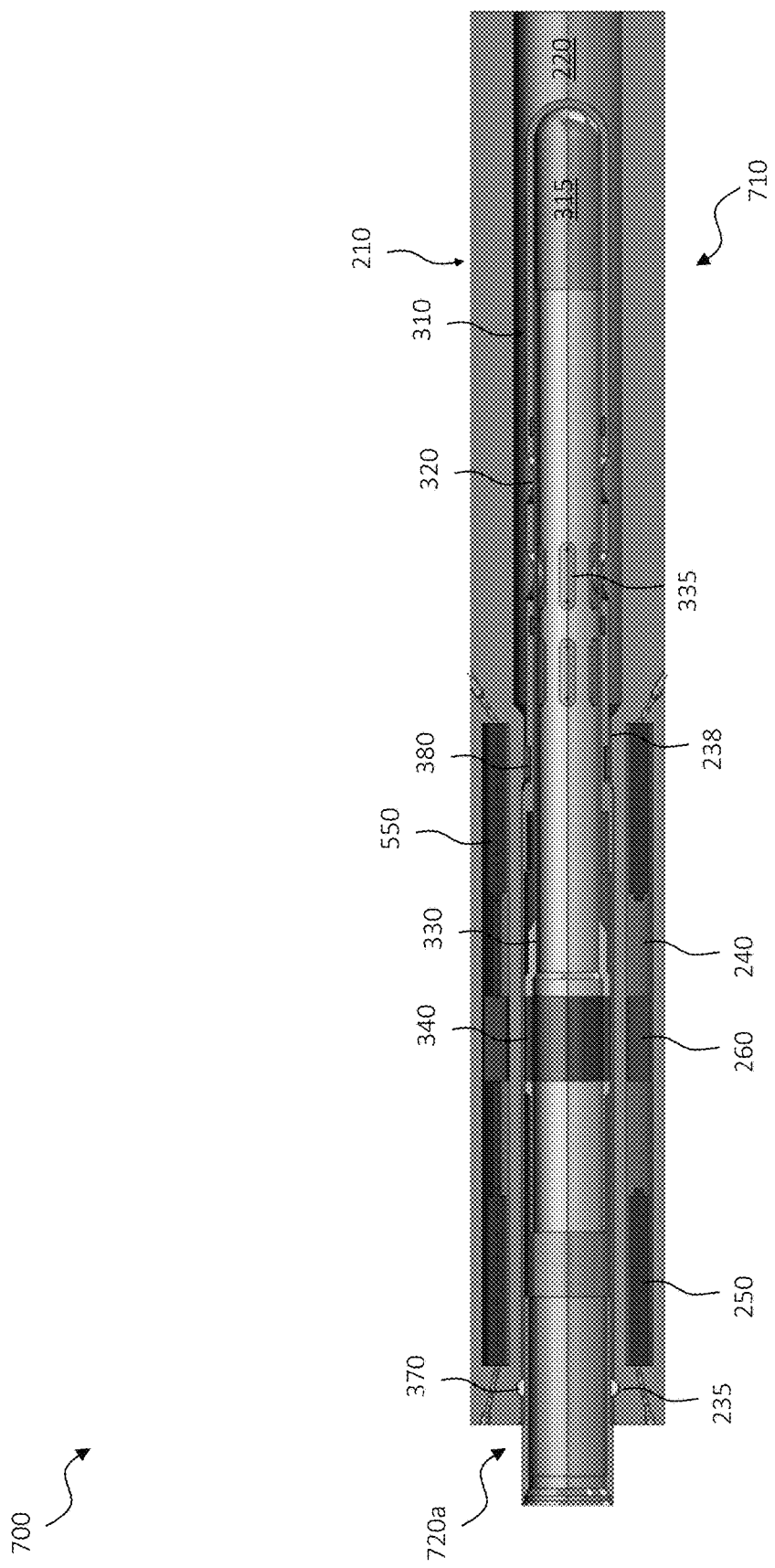

Referring to FIG. 7F, illustrated is the choke 700 of FIG. 7E after the actuator 250 has moved from the first actuator state to a second actuator state. In doing so, the actuator 250 has moved the one or more landing nipple magnets 260 from the first landing nipple magnet state to a second landing nipple magnet state. Moreover, as the one or more choke insert magnets 340 are magnetically coupled to the one or more landing nipple magnets 260, the one or more choke insert magnets 340 move from the first choke insert magnet state to a second choke insert magnet state. Additionally, as the bore flow management actuator 330 is coupled to the one or more choke insert magnets 340, the bore flow management actuator 330 moves from the first state to a second state, the second state allowing subterranean production fluid to travel through the choke 700. In the illustrated embodiment of FIG. 7F, the bore flow management actuator 330 is in the partially open/closed state (e.g., moving from the fully closed state of FIG. 4E), such that the bore flow management openings 335 are partially aligned/misaligned with the one or more bore flow management openings 320.

Figure 7G:
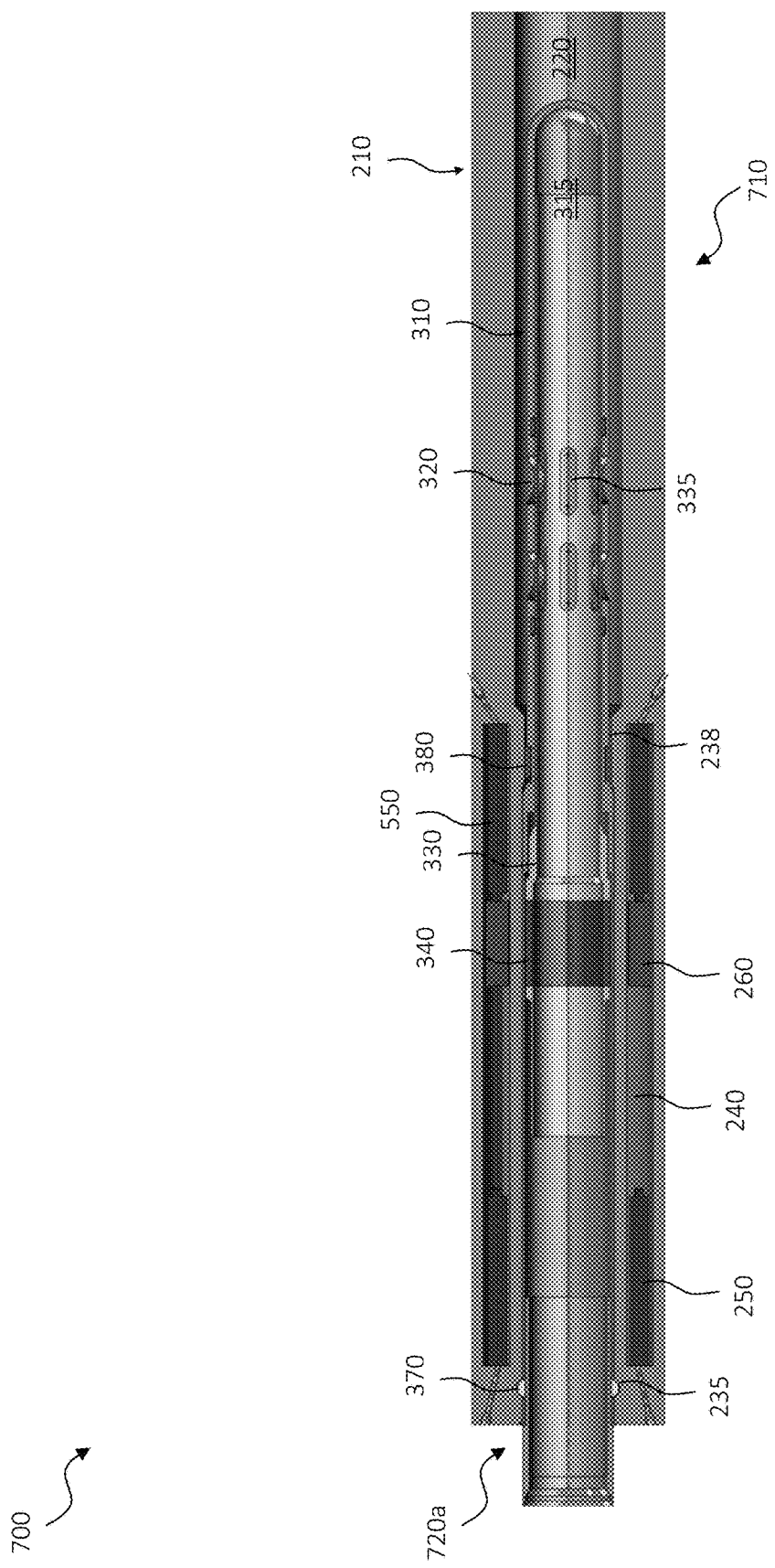

Referring to FIG. 7G, illustrated is the choke 700 of FIG. 7F after the actuator 250 has moved from the second actuator state to a third actuator state. In doing so, the actuator 250 has moved the one or more landing nipple magnets 260 from the second landing nipple magnet state to a third landing nipple magnet state. Moreover, as the one or more choke insert magnets 340 are magnetically coupled to the one or more landing nipple magnets 260, the one or more choke insert magnets 340 move from the second choke insert magnet state to a third choke insert magnet state. Additionally, as the bore flow management actuator 330 is coupled to the one or more choke insert magnets 340, the bore flow management actuator 330 moves from the second state to a third state, the third state continuing to allow subterranean production fluid to travel through the choke 700. In the illustrated embodiment of FIG. 7G, the bore flow management actuator 330 is in the fully open state (e.g., moving from the partially open/closed state of FIG. 7F), such that the bore flow management openings 335 are fully aligned with the one or more bore flow management openings 320. While the embodiments of FIGS. 7F and 7G illustrate but three different finite states, other embodiments exist wherein more or less than three finite states may be achieved, or in certain embodiments wherein the number of states is infinite.

Figure 7H:
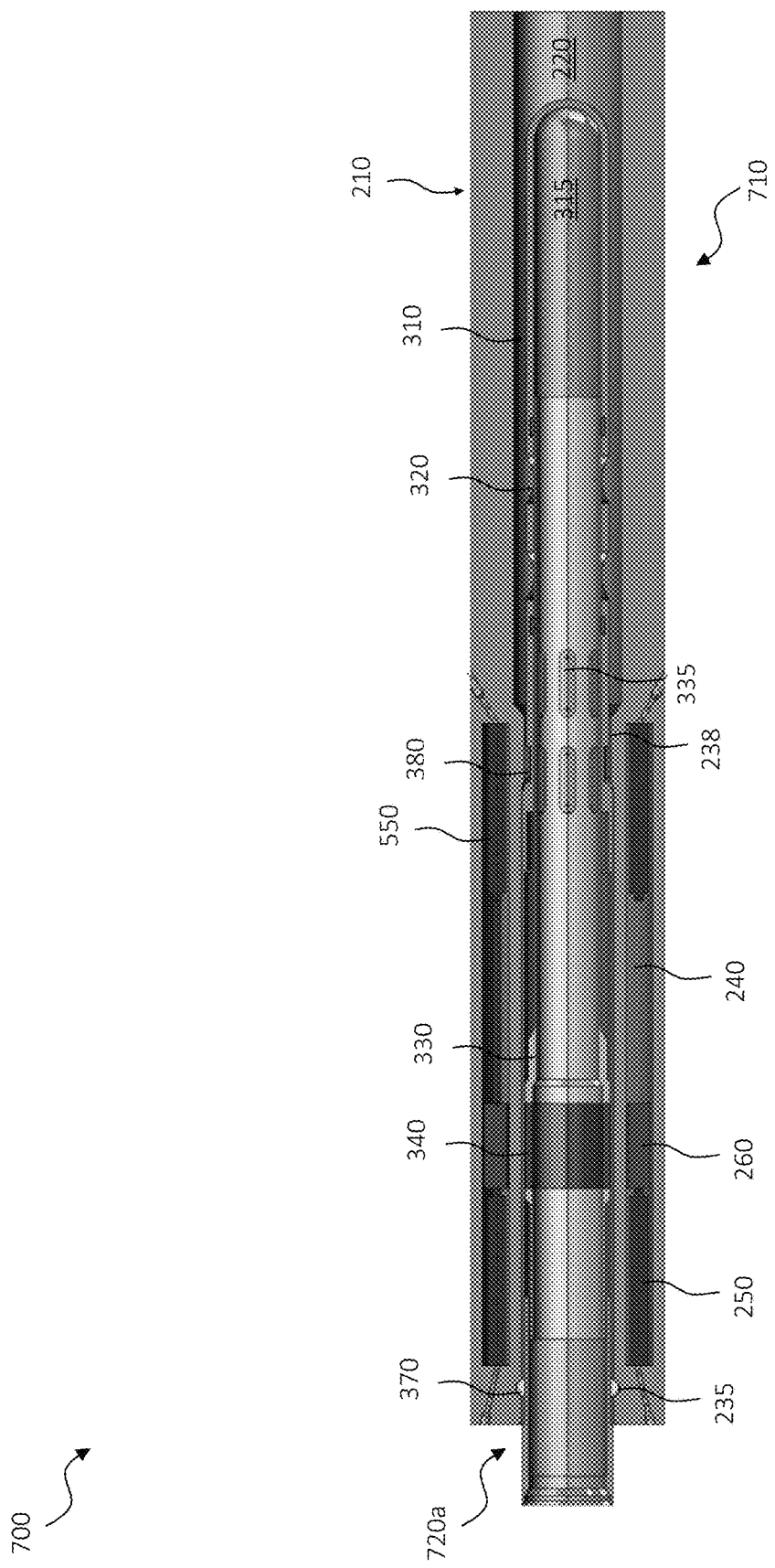

Referring to FIG. 7H, illustrated is the choke 700 of FIG. 7G after the actuator 250 has moved from the second actuator state or third actuator state back to the first actuator state. In doing so, the second actuator 550 has moved the one or more landing nipple magnets 260 from the second landing nipple magnet state or third landing nipple magnet state back to the first landing nipple magnet state. Moreover, as the one or more choke insert magnets 340 are magnetically coupled to the one or more landing nipple magnets 260, the one or more choke insert magnets 340 move from the second choke insert magnet state or third choke insert magnet state back to the first choke insert magnet state. Additionally, as the bore flow management actuator 330 is coupled to the one or more choke insert magnets 340, the bore flow management actuator 330 moves from the fully open state or partially open/closed state back to the closed state, the closed state preventing subterranean production fluid from travelling through the choke 700.

In at least one embodiment, the second actuator 550 is configured to return the one or more landing nipple magnets 260 from the second landing nipple magnet state or third landing nipple magnet state to the first landing nipple magnet state when the first and second actuators 250, 550 are not powered. For example, if the power (e.g., hydraulic and/or electric power) to the first and second actuators 250, 550 were to be intentionally removed or reduced, the second actuator 550 could move (e.g., whether independently or in conjunction with the actuator 250) the one or more landing nipple magnets 260 from the second landing nipple magnet state or third landing nipple magnet state to the first landing nipple magnet state. Similarly, if the power (e.g., hydraulic and/or electric power) to the first and second actuators 250, 550 were to be unintentionally cut, the second actuator 550 would act as a failsafe and move (e.g., independently) the one or more landing nipple magnets 260 from the second landing nipple magnet state or third landing nipple magnet state to the first landing nipple magnet state.

Figure 7I:
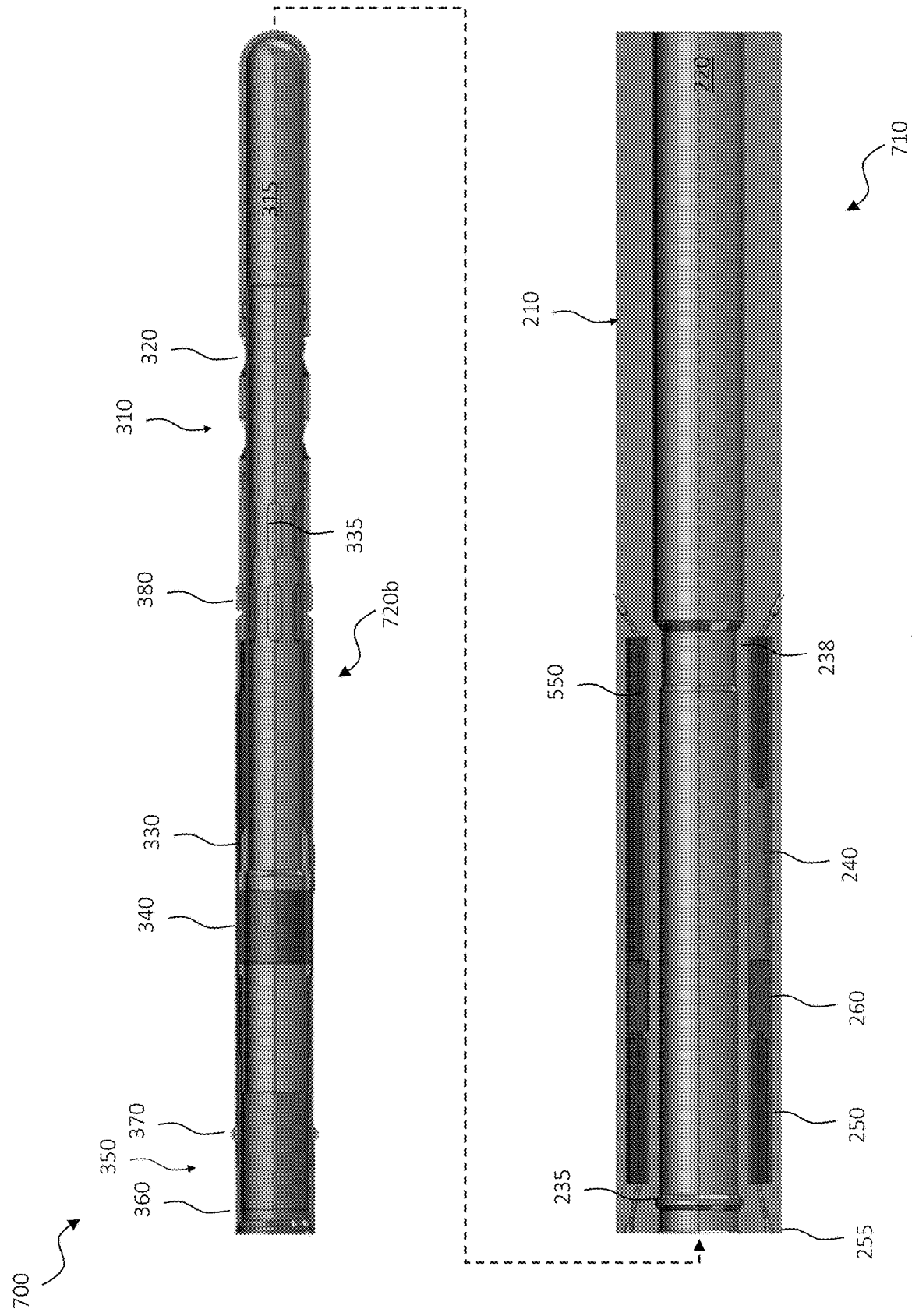

Referring to FIG. 7I, illustrated is the choke 700 of FIG. 7G after the retrievable choke insert 720a has been removed from the choke landing nipple 710, and a replacement retrievable choke insert 720b is being installed within the choke landing nipple 710. The replacement retrievable choke insert 720b is similar in many respects to the retrievable choke insert 720a. Accordingly, like reference numbers have been used to indicate similar, if not identical, features.

Figure 7J:
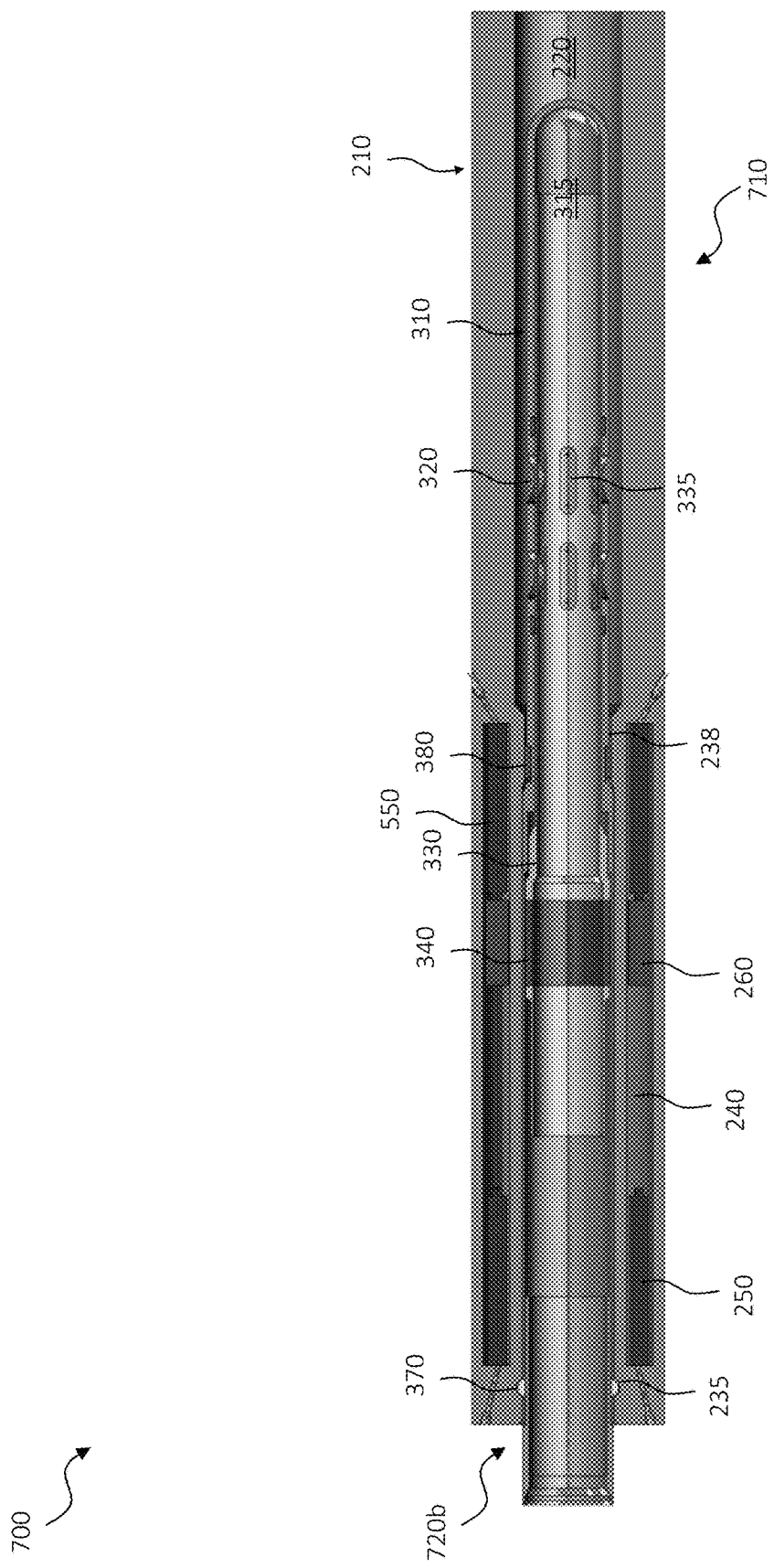

Referring to FIG. 7J, illustrated is the choke 700 of FIG. 7I after the replacement retrievable choke insert 720b is fully assembled within the choke landing nipple 710. Accordingly, the choke 700 is now assembled and operational with the replacement retrievable choke insert 720b.

Figure 8:
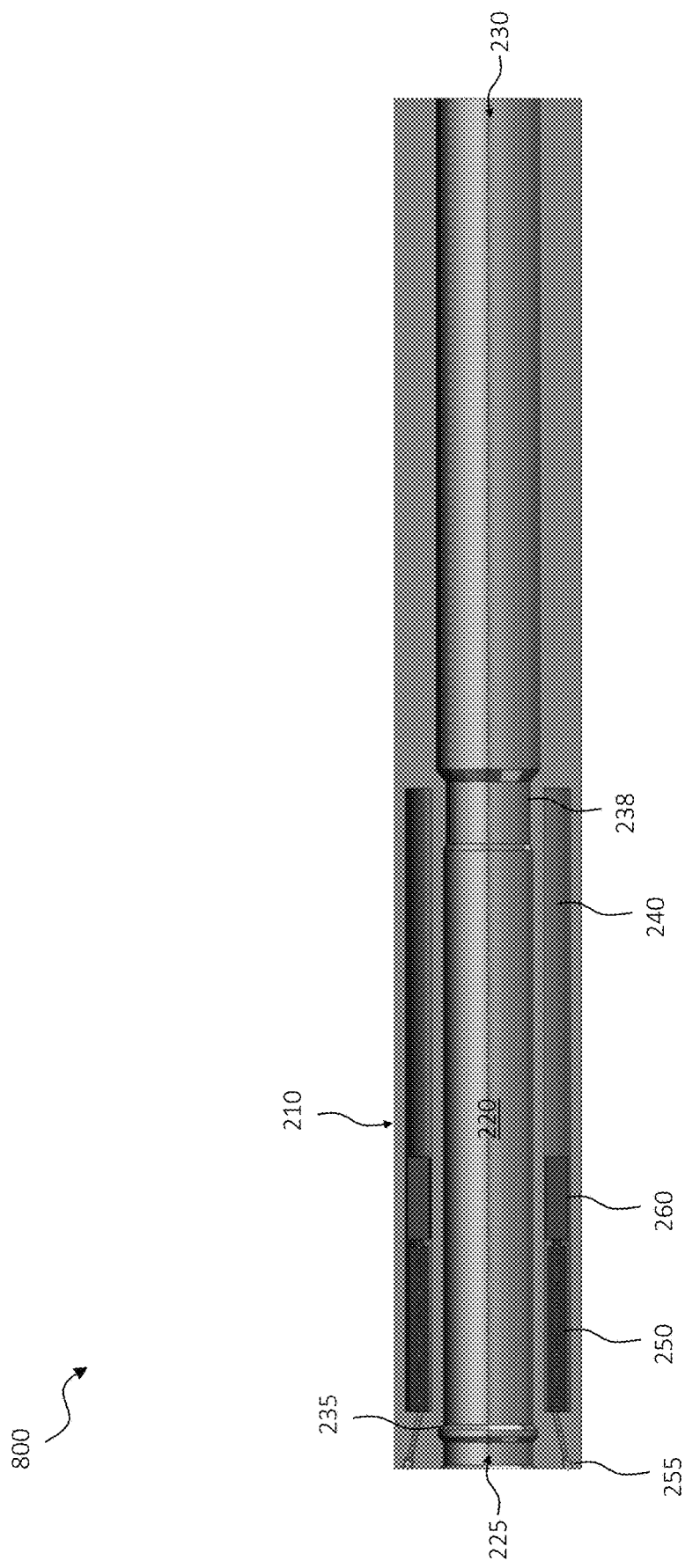
FIG. 8 illustrates one embodiment of a choke landing nipple, as might form part of a choke (e.g., choke of FIG. 1), designed and manufactured according to an alternative embodiment of the present disclosure.

Turning now to FIG. 8, illustrated is one embodiment of a choke landing nipple 800, as might form part of a choke (e.g., choke 170 of FIG. 1), designed and manufactured according to an alternative embodiment of the present disclosure. The choke landing nipple 800 is similar in many respects to the choke landing nipple 200 of FIG. 2. Accordingly, like reference numbers have been used to indicate similar, if not identical, features. The choke landing nipple 800 differs, for the most part, from the choke landing nipple 200, in that the choke landing nipple 800 does not include the power spring 270, and simply uses the actuator 250 to move the one or more landing nipple magnets between their various positions. In essence, wherein the actuator 250 is capable of pushing the one or more landing nipple magnets 260 to the right (e.g., downhole), the actuator 250 is also capable of returning (e.g., pulling) the one or more landing nipple magnets 260 to the left (e.g., uphole).

Turning now to FIG. 9, illustrated is one embodiment of a retrievable choke insert 900, as might form part of a choke (e.g., choke 170 of FIG. 1), designed and manufactured according to an alternative embodiment of the present disclosure. The retrievable choke insert 900 is similar in many respects to the retrievable choke insert 300 of FIG. 3. Accordingly, like reference numbers have been used to indicate similar, if not identical, features.

Turning now to FIGS. 10A through 10J, illustrated is an embodiment for assembling (e.g., completing downhole) and operating a choke 1000 according to one or more embodiments of the disclosure, including inserting and locking a retrievable choke insert 1020a within a choke landing nipple 1010. In the illustrated embodiment of FIGS. 10A through 10J, the choke landing nipple 1010 is similar in many respects to the choke landing nipple 800 of FIG. 8, and thus like reference numbers have been used to indicate similar, if not identical, features. Similarly, in the illustrated embodiment of FIGS. 10A through 10J, the retrievable choke insert 1020a is similar in many respects to the retrievable choke insert 900 of FIG. 9, and thus like reference numbers have been used to indicate similar, if not identical, features. While not illustrated, the choke landing nipple 1010 might be interconnected between pairs of oilfield tubulars, for example between pairs of threaded joint tubing. Furthermore, while not shown, a downhole conveyance, such as wireline, slickline, coiled tubing, a wellbore tractor, etc. may be coupled to the retrievable choke insert 1020a for placing, securing and retrieving the retrievable choke insert 1020a within/from the choke landing nipple 1010.

Figure 10A:
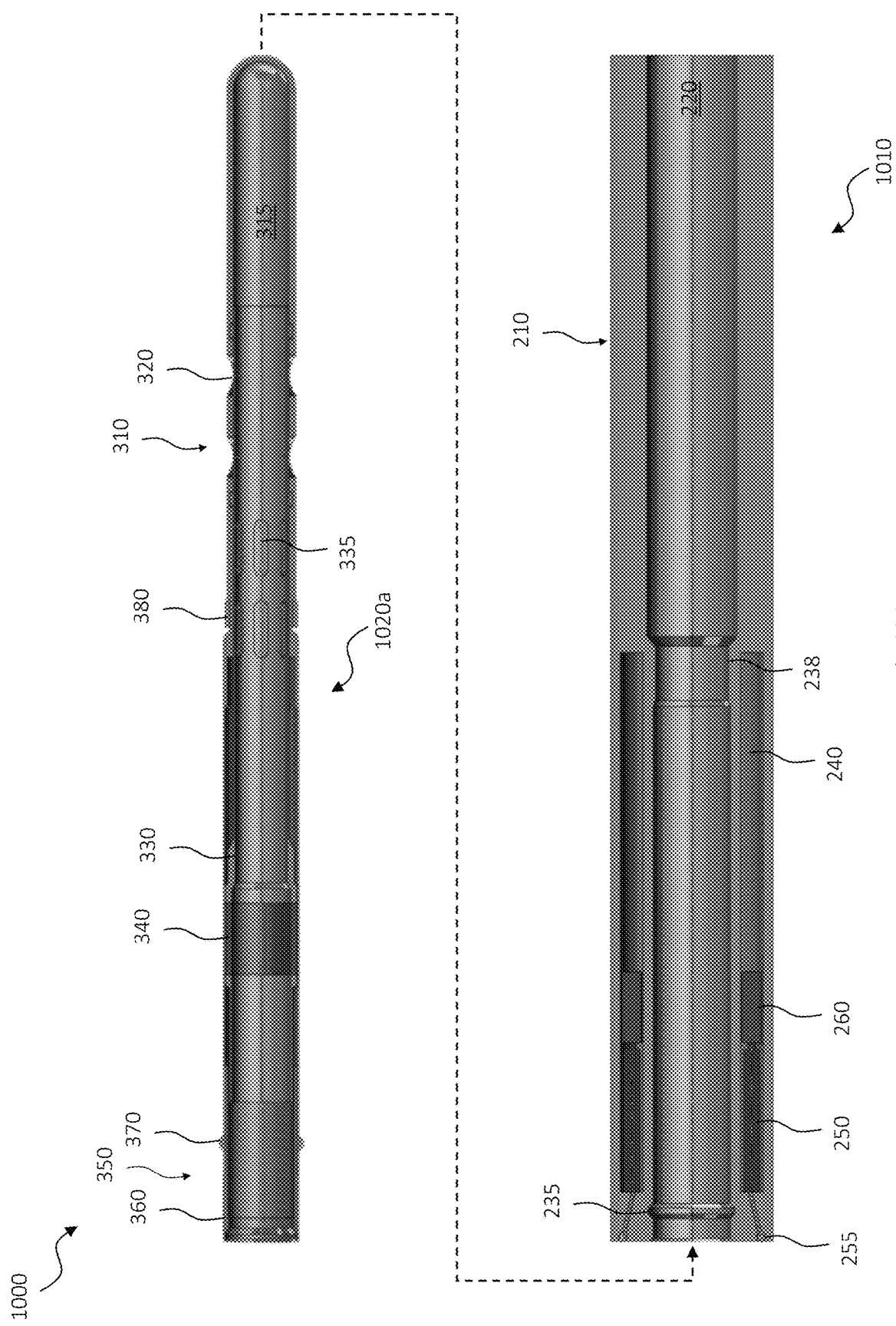

Referring to FIG. 10A, the choke landing nipple 1010 and the retrievable choke insert 1020a are separate from one another, for example as they might be positioned as the retrievable choke insert 1020a were travelling down the wellbore toward the choke landing nipple 1010. As shown in the embodiment of FIG. 10A, the actuator 250 of the choke landing nipple 1010 is in a first actuator state. As further shown in the embodiment of FIG. 10A, the bore flow management actuator 330 is in a fully closed state, such that the bore flow management openings 335 are fully misaligned (e.g., either axially or rotationally) with the one or more bore flow management openings 320. Furthermore, the one or more locking features 370 of the retrievable choke insert 1020a may be in the radially retracted state, as the sliding sleeve 360 has yet to slide to move the one or more locking features 370 to the radially extended state.

Figure 10B:
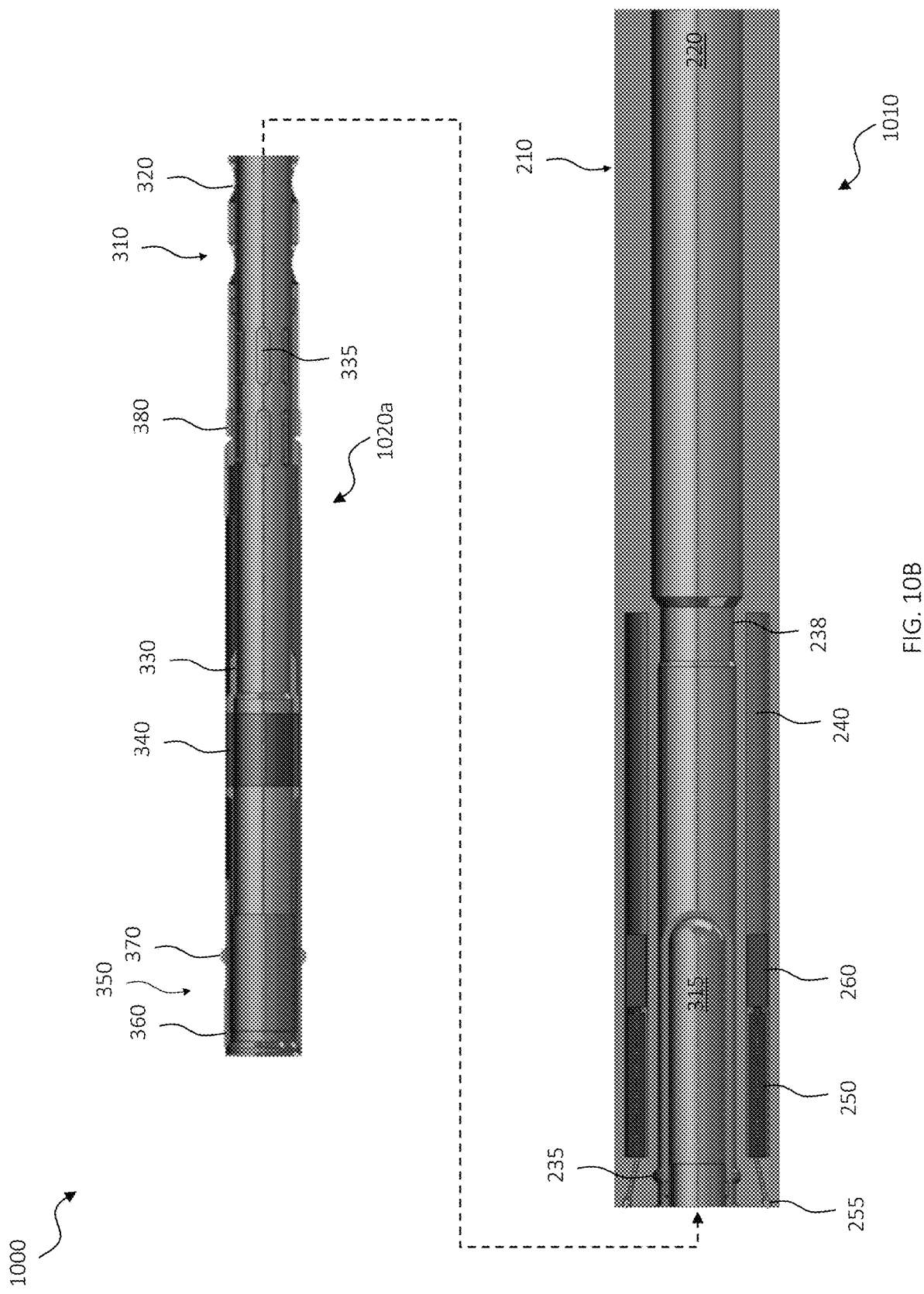

Referring to FIG. 10B, illustrated is the choke 1000 of FIG. 10A after a small portion of the retrievable choke insert 1020a has entered the choke landing nipple 1010. In the embodiment of FIG. 10B, a downhole end of the retrievable choke insert 1020a is approaching the one or more landing nipple magnets 260. The choke landing nipple 1010 and the retrievable choke insert 1020a are in substantially the same operational configuration in FIG. 10B as they were in FIG. 10A, but for the small portion of the retrievable choke insert 1020a having entered the choke landing nipple 1010.

Figure 10C:
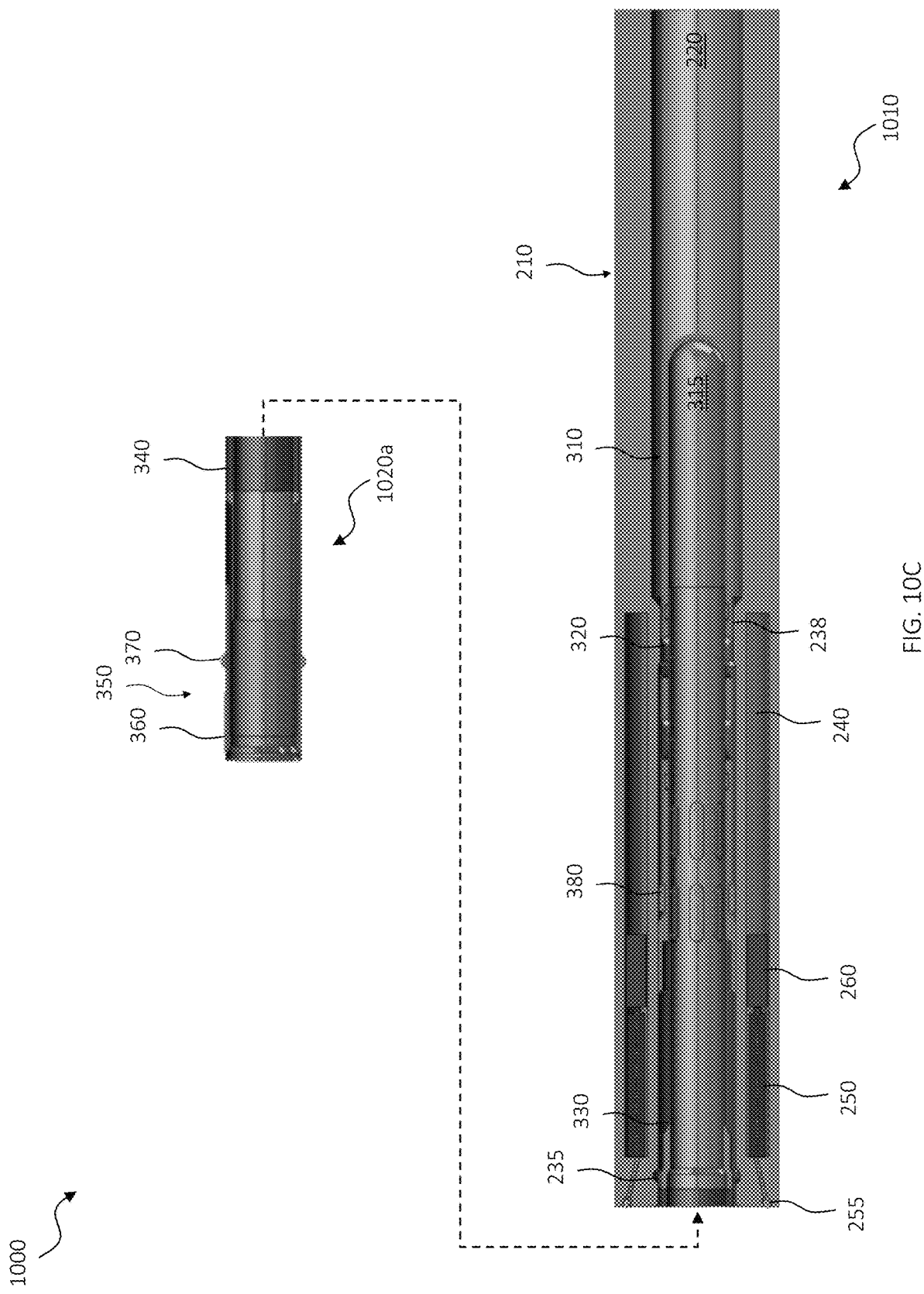

Referring to FIG. 10C, illustrated is the choke 1000 of FIG. 10B after a significant portion of the retrievable choke insert 1020a has entered the choke landing nipple 1010. In the embodiment of FIG. 10C, a downhole end of the retrievable choke insert 1020a has extended past the polished bore receptacle 238. The choke landing nipple 1010 and the retrievable choke insert 1020a are in substantially the same operational configuration in FIG. 10C as they were in FIG. 10B, but for the significant portion of the retrievable choke insert 1020a having entered the choke landing nipple 1010.

Figure 10D:
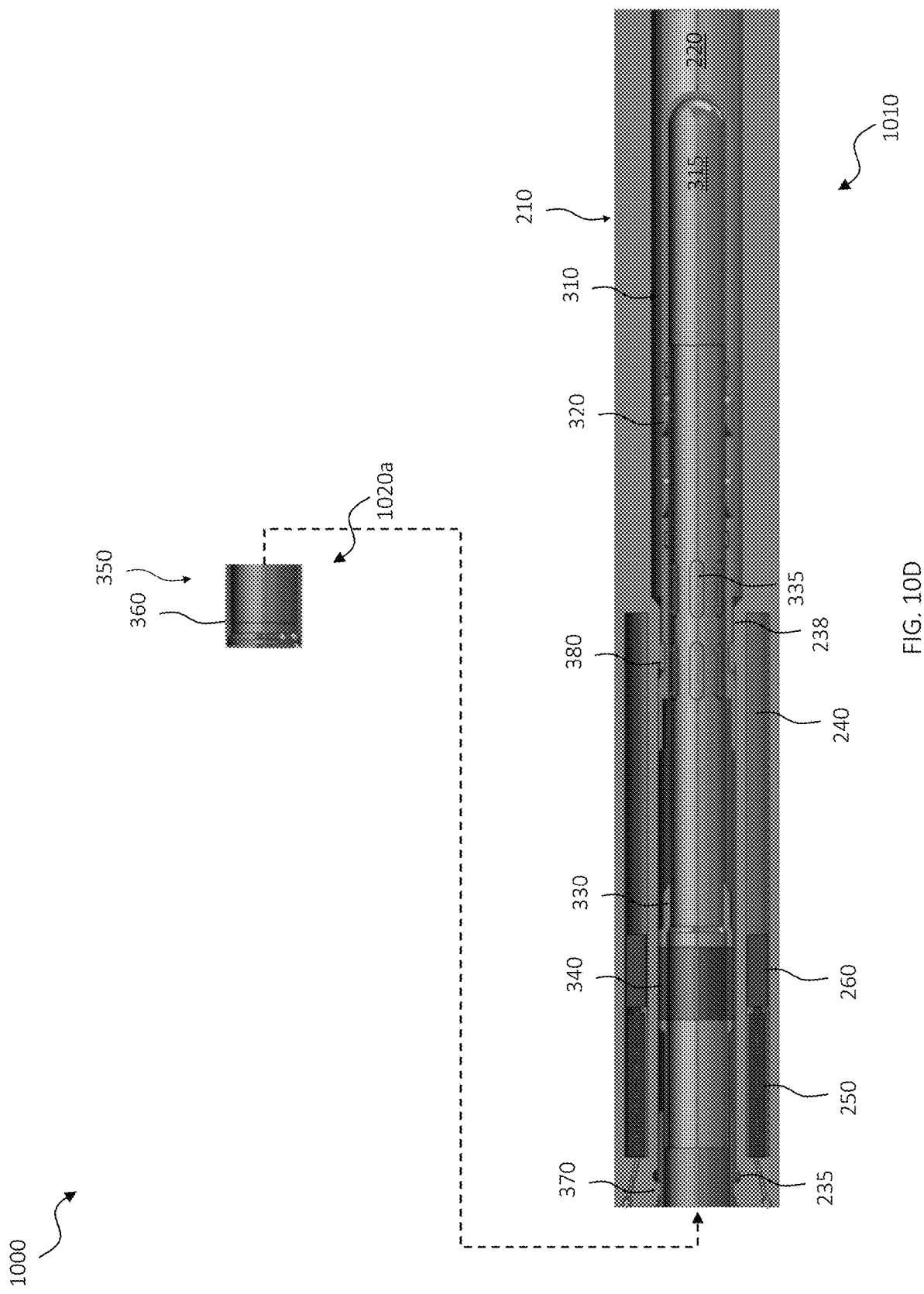

Referring to FIG. 10D, illustrated is the choke 1000 of FIG. 10C after almost all of the retrievable choke insert 1020a has entered the choke landing nipple 1010. In the embodiment of FIG. 10D, the locking feature 370 is approaching the latch profile 235. The choke landing nipple 1010 and the retrievable choke insert 1020a are in substantially the same operational configuration in FIG. 10D as they were in FIG. 10C, but for almost all of the retrievable choke insert 1020a having entered the choke landing nipple 1010.

Figure 10E:
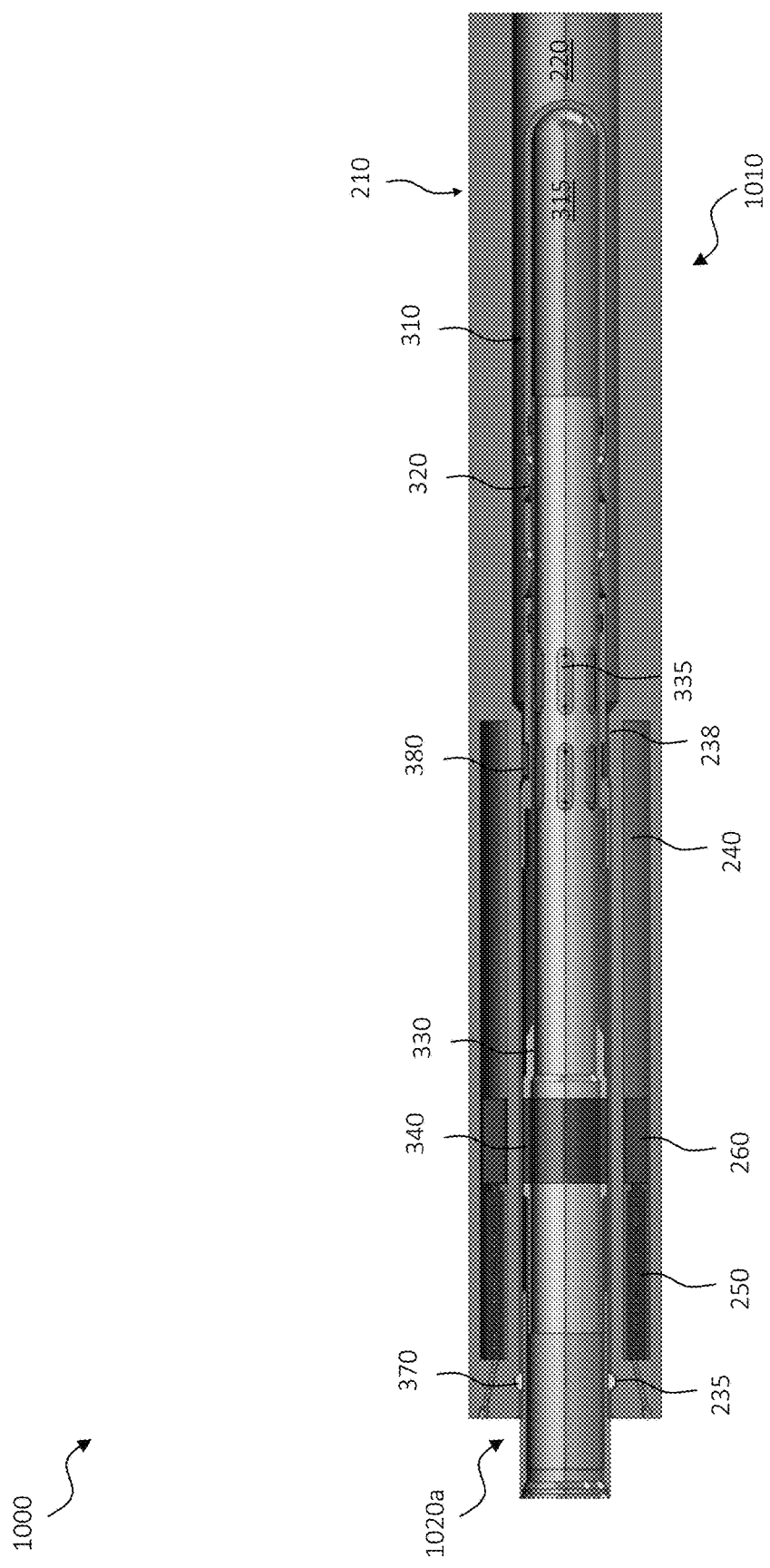

Referring to FIG. 10E, illustrated is the choke 1000 of FIG. 10D after the locking feature 370 is located under the latch profile 235, and the sliding sleeve 360 has slid down moving the locking feature 370 from the radially retracted state to the radially extended state. Accordingly, the locking feature 370 now engages with the latch profile 235. Furthermore, the one or more choke insert magnets 340 are now magnetically coupled to the one or more landing nipple magnets 260. Additionally, the one or more seals 380 are in sealing engagement with the polished bore receptacle 238. Accordingly, the choke 1000 is now assembled and operational.

Figure 10F:
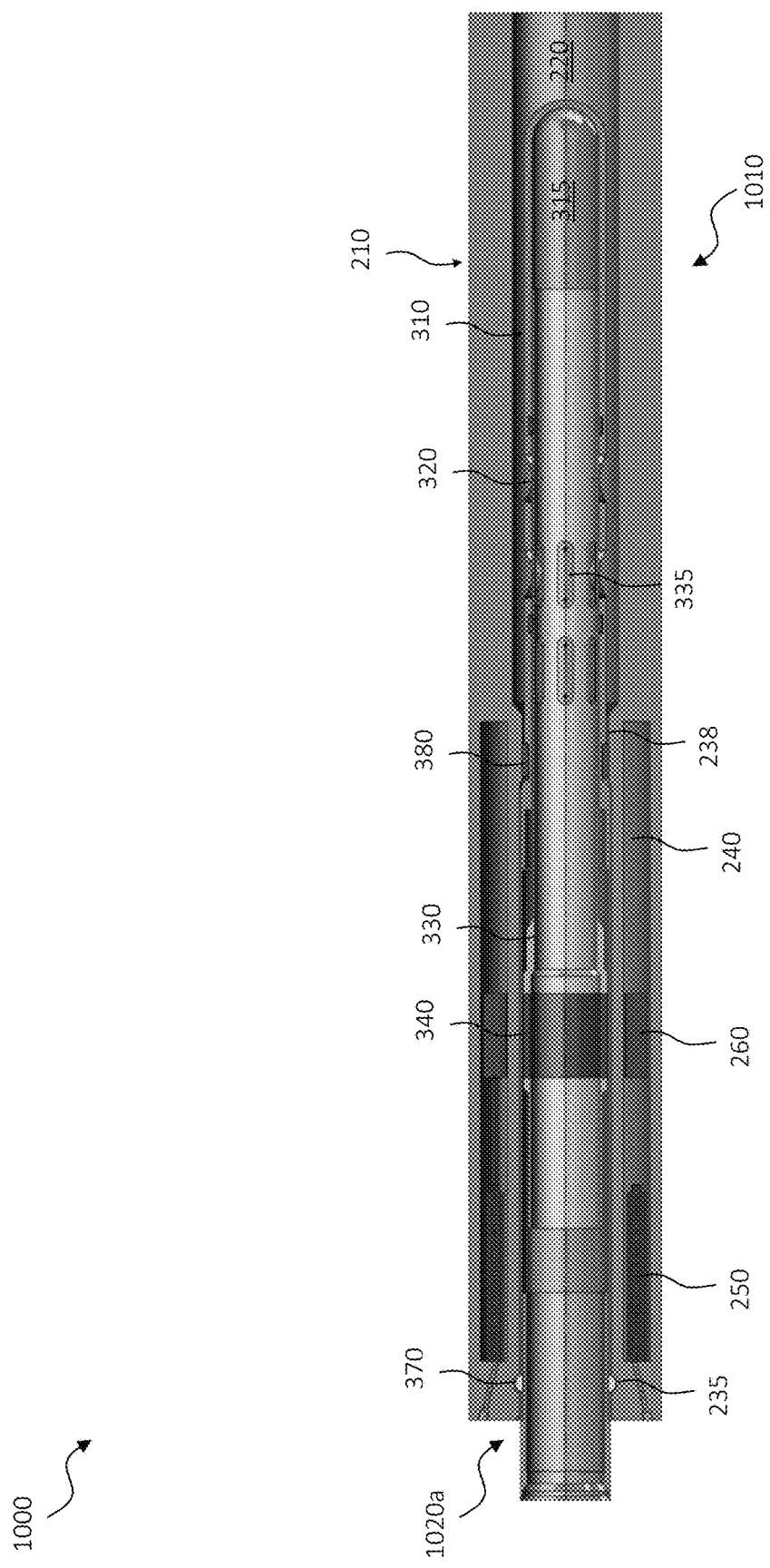

Referring to FIG. 10F, illustrated is the choke 1000 of FIG. 10E after the actuator 250 has moved from the first actuator state to a second actuator state. In doing so, the actuator 250 has moved the one or more landing nipple magnets 260 from the first landing nipple magnet state to a second landing nipple magnet state. Moreover, as the one or more choke insert magnets 340 are magnetically coupled to the one or more landing nipple magnets 260, the one or more choke insert magnets 340 move from the first choke insert magnet state to a second choke insert magnet state. Additionally, as the bore flow management actuator 330 is coupled to the one or more choke insert magnets 340, the bore flow management actuator 330 moves from the first state to a second state, the second state allowing subterranean production fluid to travel through the choke 1000. In the illustrated embodiment of FIG. 10F, the bore flow management actuator 330 is in the partially open/closed state (e.g., moving from the fully closed state of FIG. 10E), such that the bore flow management openings 335 are partially aligned/misaligned with the one or more bore flow management openings 320.

Figure 10G:
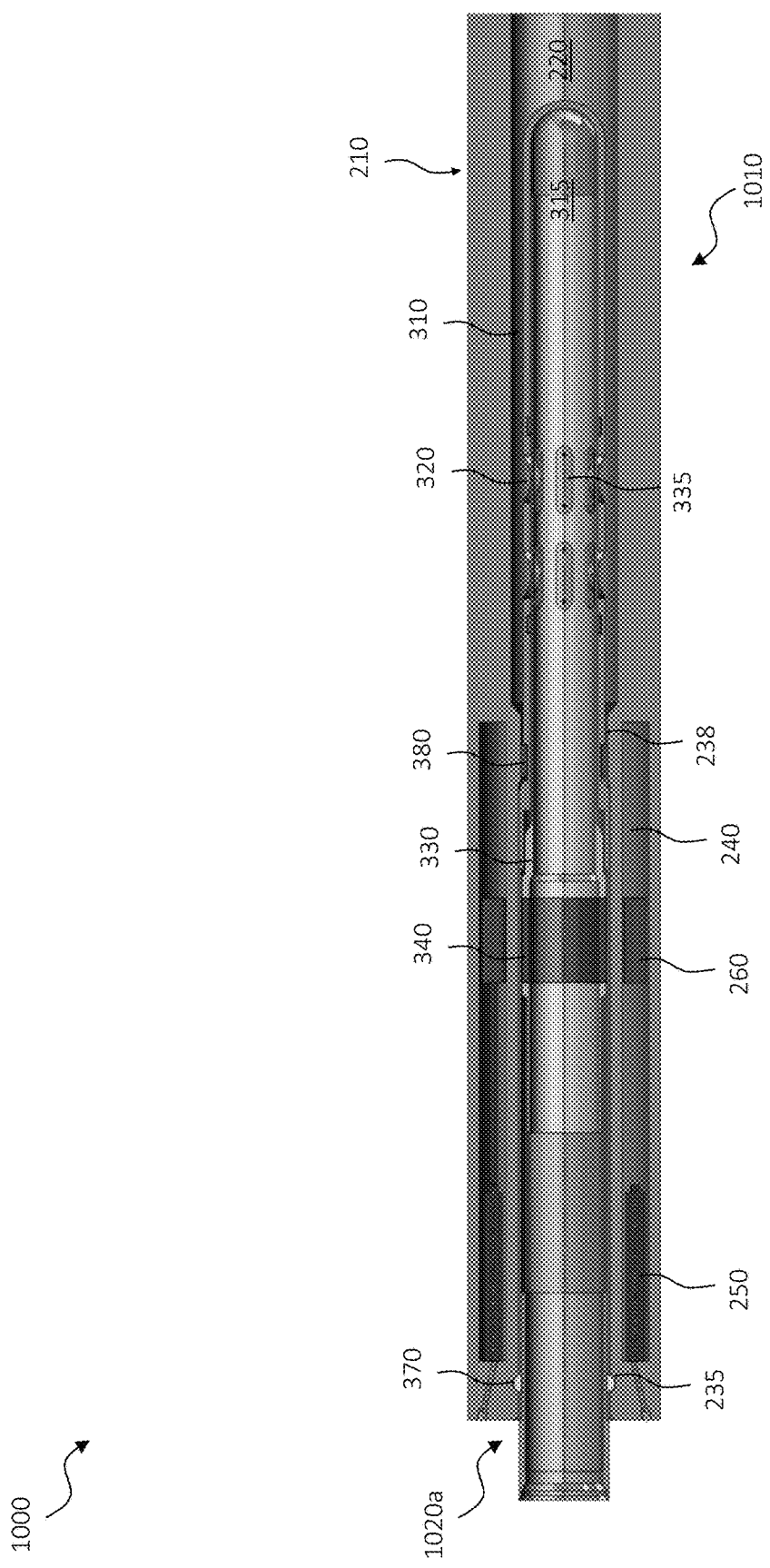

Referring to FIG. 10G, illustrated is the choke 1000 of FIG. 10F after the actuator 250 has moved from the second actuator state to a third actuator state. In doing so, the actuator 250 has moved the one or more landing nipple magnets 260 from the second landing nipple magnet state to a third landing nipple magnet state. Moreover, as the one or more choke insert magnets 340 are magnetically coupled to the one or more landing nipple magnets 260, the one or more choke insert magnets 340 move from the second choke insert magnet state to a third choke insert magnet state. Additionally, as the bore flow management actuator 330 is coupled to the one or more choke insert magnets 340, the bore flow management actuator 330 moves from the second state to a third state, the third state continuing to allow subterranean production fluid to travel through the choke 1000. In the illustrated embodiment of FIG. 10G, the bore flow management actuator 330 is in the fully open state (e.g., moving from the partially open/closed state of FIG. 10F), such that the bore flow management openings 335 are fully aligned with the one or more bore flow management openings 320. While the embodiments of FIGS. 10F and 10G illustrate but three different finite states, other embodiments exist wherein more or less than three finite states may be achieved, or in certain embodiments wherein the number of states is infinite.

Figure 10H:
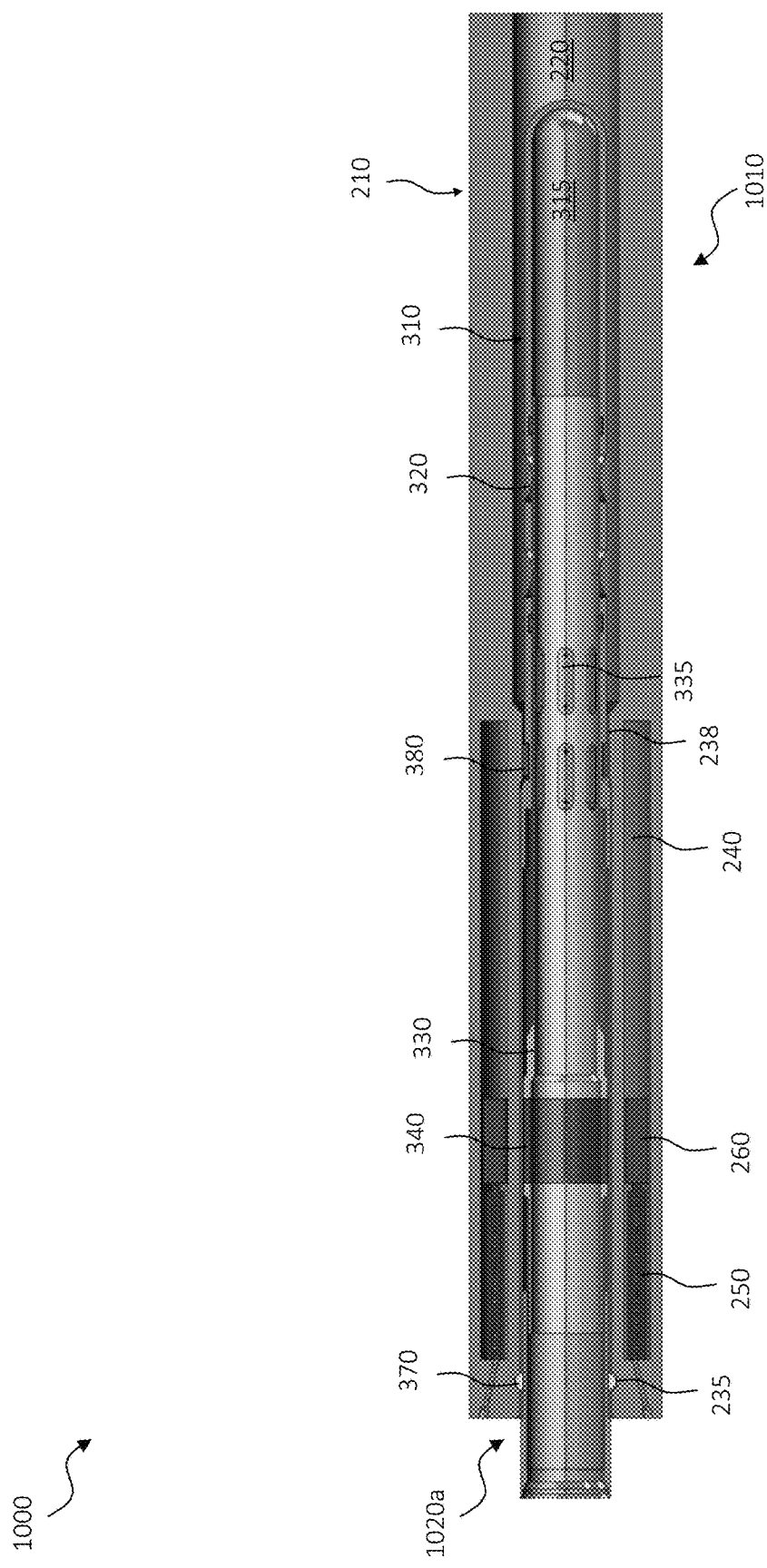

Referring to FIG. 10H, illustrated is the choke 1000 of FIG. 10G after the actuator 250 has moved from the second actuator state or third actuator state back to the first actuator state. In doing so, the actuator 250 (as opposed to a power spring or a second actuator) has moved the one or more landing nipple magnets 260 from the second landing nipple magnet state or third landing nipple magnet state back to the first landing nipple magnet state. Moreover, as the one or more choke insert magnets 340 are magnetically coupled to the one or more landing nipple magnets 260, the one or more choke insert magnets 340 move from the second choke insert magnet state or third choke insert magnet state back to the first choke insert magnet state. Additionally, as the bore flow management actuator 330 is coupled to the one or more choke insert magnets 340, the bore flow management actuator 330 moves from the fully open state or partially open/closed state back to the closed state, the closed state preventing subterranean production fluid from travelling through the choke 1000.

In at least one embodiment, the actuator 250 is configured to return the one or more landing nipple magnets 260 from the second landing nipple magnet state or third landing nipple magnet state to the first landing nipple magnet state when the actuator 250 is not powered. For example, if the power (e.g., hydraulic and/or electric power) to the actuator 250 were to be intentionally removed or reduced, the actuator 250 could move the one or more landing nipple magnets 260 from the second landing nipple magnet state or third landing nipple magnet state to the first landing nipple magnet state. Similarly, if the power (e.g., hydraulic and/or electric power) to the actuator 250 were to be unintentionally cut, the actuator 250 would act as a failsafe and move (e.g., independently) the one or more landing nipple magnets 260 from the second landing nipple magnet state or third landing nipple magnet state to the first landing nipple magnet state.

Figure 10I:
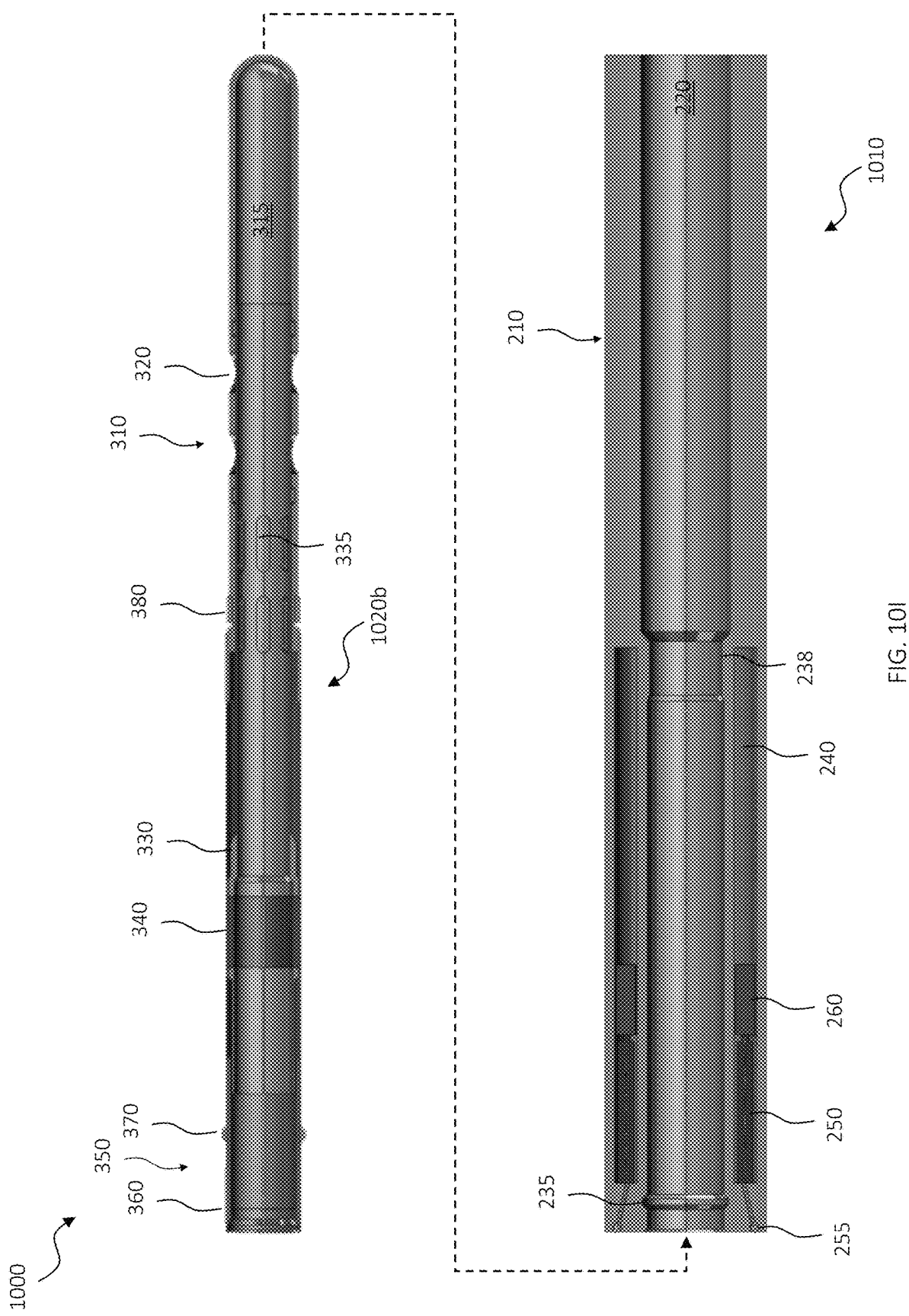

Referring to FIG. 10I, illustrated is the choke 1000 of FIG. 10G after the retrievable choke insert 1020*a* has been removed from the choke landing nipple 1010, and a replacement retrievable choke insert 1020*b* is being installed within the choke landing nipple 1010. The replacement retrievable choke insert 1020*b* is similar in many respects to the retrievable choke insert 1020*a*. Accordingly, like reference numbers have been used to indicate similar, if not identical, features.

Figure 10J:
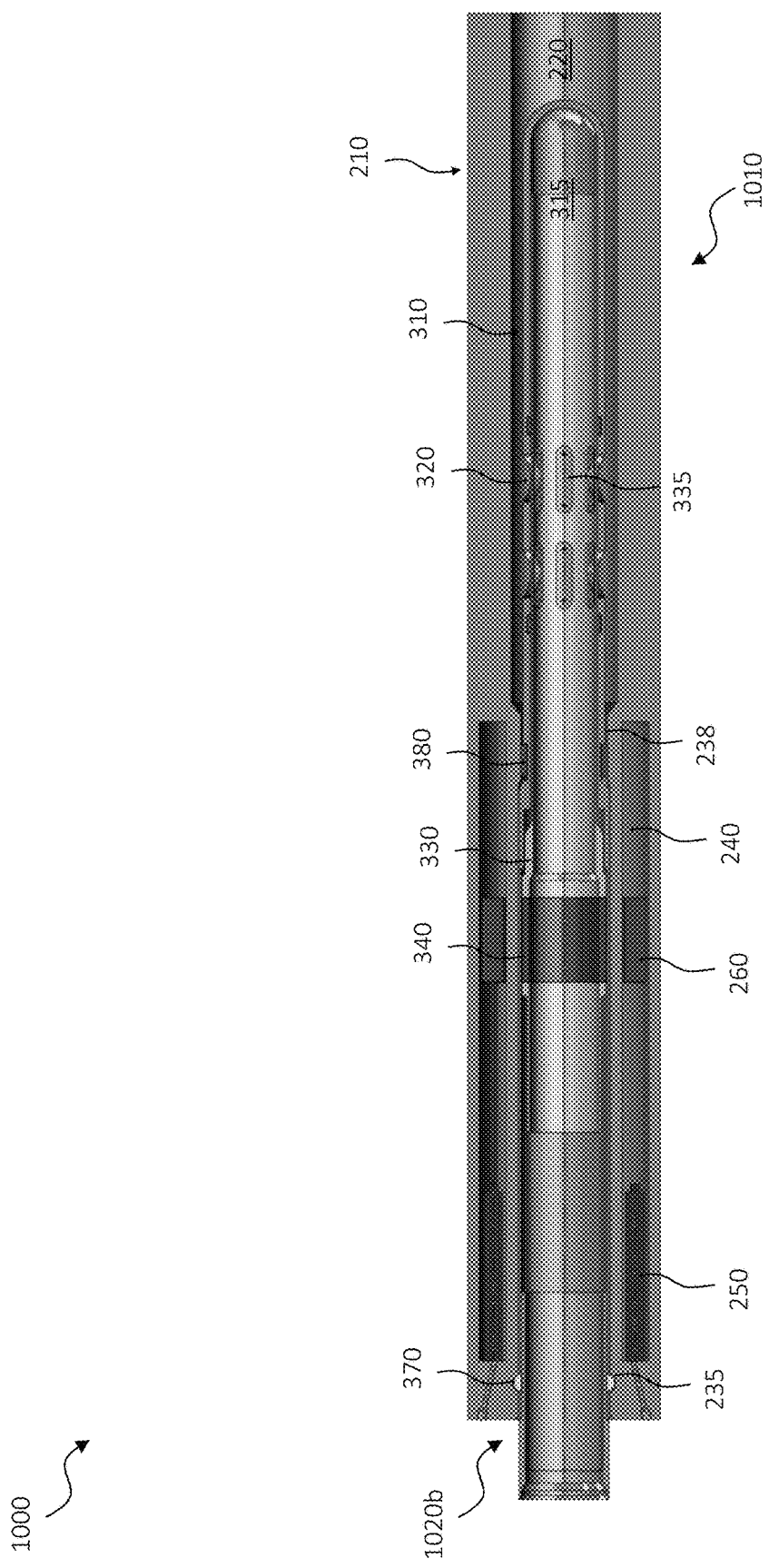

Referring to FIG. 10J, illustrated is the choke 1000 of FIG. 10I after the replacement retrievable choke insert 1020*b* is fully assembled within the choke landing nipple 1010. Accordingly, the choke 1000 is now assembled and operational with the replacement retrievable choke insert 1020*b*.

Aspects disclosed herein include:

A. A retrievable choke insert, the retrievable choke insert including: 1) an outer housing including a central bore extending axially through the outer housing, an open end, a closed end, and one or more outer housing openings extending through an outer housing sidewall thickness; 2) a bore flow management actuator disposed in the central bore, the bore flow management actuator having one or more bore flow management openings extending through a bore flow management actuator sidewall thickness, the bore flow management actuator operable to convey subsurface production fluids there through; and 3) one or more choke insert magnets coupled to the bore flow management actuator, the one or more choke insert magnets configured to magnetically couple with one or more landing nipple magnets of a choke landing nipple to slide the bore flow management actuator and move the one or more bore flow management openings relative to the one or more outer housing openings to control an amount of the subsurface production fluid entering the bore flow management actuator.

B. A choke landing nipple, the choke landing nipple including: 1) a housing having a passageway extending from a first end to a second end thereof; 2) an isolated chamber located in the housing; 3) an actuator positioned within the isolated chamber; and 4) one or more landing nipple magnets coupled to the actuator within the isolated chamber, the one or more landing nipple magnets configured to move from a first landing nipple magnet state to a second landing nipple state when the actuator moves from a first actuator state to a second actuator state, the one or more landing nipple magnets configured to magnetically coupled to one or more choke insert magnets located in the passageway.

C. A well system, the well system including: 1) a wellbore extending through one or more subterranean formations; 2) production tubing disposed in the wellbore; 3) a subsurface choke disposed in line with the production tubing, the subsurface choke including: a) a choke landing nipple, the choke landing nipple including: i) a housing having a passageway extending from a first end to a second end thereof; ii) an isolated chamber located in the housing; iii) an actuator positioned within the isolated chamber; and iv) one or more landing nipple magnets coupled to the actuator within the isolated chamber, the one or more landing nipple magnets configured to move from a first landing nipple magnet state to a second landing nipple state when the actuator moves from a first actuator state to a second actuator state; and b) a retrievable choke insert located within the choke landing nipple, the retrievable choke insert including: i) an outer housing including a central bore extending axially through the outer housing, an open end, a closed end, and one or more outer housing openings extending through an outer housing sidewall thickness; ii) a bore flow management actuator disposed in the central bore, the bore flow management actuator having one or more bore flow management openings extending through a bore flow management actuator sidewall thickness, the bore flow management actuator operable to convey subsurface production fluids there through; and iii) one or more choke insert magnets coupled to the bore flow management actuator, the one or more choke insert magnets magnetically coupled with the one or more landing nipple magnets of the choke landing nipple to slide the bore flow management actuator and move the one or more bore flow management openings relative to the one or more outer housing openings to control an amount of the subsurface production fluid entering the bore flow management actuator.

D. A method for assembling and operating a subsurface choke, the method including: 1) positioning a choke landing nipple disposed in line with production tubing in a wellbore, the choke landing nipple including: a) a housing having a passageway extending from a first end to a second end thereof; b) an isolated chamber located in the housing; c) an actuator positioned within the isolated chamber; and d) one or more landing nipple magnets coupled to the actuator within the isolated chamber, the one or more landing nipple magnets configured to move from a first landing nipple magnet state to a second landing nipple state when the actuator moves from a first actuator state to a second actuator state; and 2) inserting a retrievable choke insert within the choke landing nipple located in the wellbore, the retrievable choke insert including: a) an outer housing including a central bore extending axially through the outer housing, an open end, a closed end, and one or more outer housing openings extending through an outer housing sidewall thickness; b) a bore flow management actuator disposed in the central bore, the bore flow management actuator having one or more bore flow management openings extending through a bore flow management actuator sidewall thickness, the bore flow management actuator operable to convey subsurface production fluids there through; and c) one or more choke insert magnets coupled to the bore flow management actuator, the one or more choke insert magnets magnetically coupled with the one or more landing nipple magnets of the choke landing nipple to slide the bore flow management actuator and move the one or more bore flow management openings relative to the one or more outer housing openings to control an amount of the subsurface production fluid entering the bore flow management actuator.

Aspects A, B, C and D may have one or more of the following additional elements in combination: Element 1: further including a landing nipple locking feature. Element 2: wherein the landing nipple locking feature includes a sliding sleeve and one or more locking features, the one or more locking features configured to engage with one or more latch profiles in the choke landing nipple. Element 3: wherein the sliding sleeve is configured to slide to move the one or more locking features from a radially retracted state to a radially extended state to engage with the one or more latch profiles in the choke landing nipple. Element 4: wherein the outer housing entirely surrounds the bore flow management actuator and couples to and surrounds at least a portion of the landing nipple locking feature. Element 5: wherein the landing nipple locking feature is slidingly fixed to the bore flow management actuator. Element 6: wherein the one or more locking features are configured to extend through the outer housing to engage with the one or more latch profiles in the choke landing nipple. Element 7: wherein the landing nipple locking feature and the bore flow management actuator are separate and distinct features. Element 8: further including one or more seals disposed radially about the outer housing, the one or more seals configured to engage with a polished bore receptacle of the choke landing nipple. Element 9: wherein the outer housing includes two or more outer housing openings extending through an outer housing sidewall thickness and the bore flow management actuator includes two or more bore flow management openings extending through a bore flow management actuator sidewall thickness. Element 10: wherein the actuator is configured to move the one or more landing nipple magnets from the first landing nipple magnet state to the second landing nipple magnet state, and further including a power spring located in the isolated chamber and coupled to the one or more landing nipple magnets, the power spring configured to return the one or more landing nipple magnets from the second landing nipple magnet state to the first landing nipple magnet state. Element 11: wherein the actuator is a first actuator configured to move the one or more landing nipple magnets from the first landing nipple magnet state to the second landing nipple magnet state, and further including a second actuator positioned within the isolated chamber and configured to return the one or more landing nipple magnets from the second landing nipple magnet state to the first landing nipple magnet state. Element 12: wherein the actuator is a single actuator configured to move the one or more landing nipple magnets from the first landing nipple magnet state to the second landing nipple magnet state and return the one or more landing nipple magnets from the second landing nipple magnet state to the first landing nipple magnet state. Element 13: further including a polished bore receptacle located proximate the second end, the polished bore receptacle configured to engage with a seal of a retrievable choke insert. Element 14: further including actuating the actuator to move the landing nipple magnets from a first landing nipple magnet state to a second landing nipple state and in turn move the one or more choke magnets from a first choke insert magnet state to a second choke insert magnet state and in turn move the bore flow management actuator to at least partially align the one or more bore flow management openings and the one or more outer housing openings. Element 15: further including removing the retrievable choke insert from within the choke landing nipple, and then inserting a replacement retrievable choke insert within the choke landing nipple. Element 16: wherein the inserting and the removing including using a wireline, coiled tubing or a wellbore tractor to replace and remove. Element 17: wherein the inserting the retrievable choke insert within the choke landing nipple includes inserting the retrievable choke insert within the choke landing nipple in a single downhole trip. Element 18: wherein the inserting the retrievable choke insert within the choke landing nipple includes inserting the retrievable choke insert within the choke landing nipple in two downhole trips.

Those skilled in the art to which this application relates will appreciate that other and further additions, deletions, substitutions and modifications may be made to the described embodiments.

What is claimed is:

1. A retrievable choke insert, comprising:
an outer housing including a central bore extending axially through the outer housing, an open end, a closed end, and one or more outer housing openings extending through an outer housing sidewall thickness;
a bore flow management actuator disposed in the central bore, the bore flow management actuator having one or more bore flow management openings extending through a bore flow management actuator sidewall thickness, the bore flow management actuator operable to convey subsurface production fluids there through; and one or more choke insert magnets coupled to the bore flow management actuator, the one or more choke insert magnets configured to magnetically couple with one or more landing nipple magnets of a choke landing nipple to slide the bore flow management actuator and move the one or more bore flow management openings relative to the one or more outer housing openings to control an amount of the subsurface production fluid entering the bore flow management actuator.

2. The retrievable choke insert as recited in claim 1, further including a landing nipple locking feature.

3. The retrievable choke insert as recited in claim 2, wherein the landing nipple locking feature includes a sliding sleeve and one or more locking features, the one or more locking features configured to engage with one or more latch profiles in the choke landing nipple.

4. The retrievable choke insert as recited in claim 3, wherein the sliding sleeve is configured to slide to move the one or more locking features from a radially retracted state to a radially extended state to engage with the one or more latch profiles in the choke landing nipple.

5. The retrievable choke insert as recited in claim 3, wherein the outer housing entirely surrounds the bore flow management actuator and couples to and surrounds at least a portion of the landing nipple locking feature.

6. The retrievable choke insert as recited in claim 5, wherein the landing nipple locking feature is slidingly fixed to the bore flow management actuator.

7. The retrievable choke insert as recited in claim 5, wherein the one or more locking features are configured to extend through the outer housing to engage with the one or more latch profiles in the choke landing nipple.

8. The retrievable choke insert as recited in claim 3, wherein the landing nipple locking feature and the bore flow management actuator are separate and distinct features.

9. The retrievable choke insert as recited in claim 1, further including one or more seals disposed radially about the outer housing, the one or more seals configured to engage with a polished bore receptacle of the choke landing nipple.

10. The retrievable choke insert as recited in claim 1, wherein the outer housing includes two or more outer housing openings extending through an outer housing sidewall thickness and the bore flow management actuator includes two or more bore flow management openings extending through a bore flow management actuator sidewall thickness.

11. A choke landing nipple, comprising:
a housing having a passageway extending from a first end to a second end thereof;
an isolated chamber located in the housing;
an actuator positioned within the isolated chamber; and
one or more landing nipple magnets coupled to the actuator within the isolated chamber, the one or more landing nipple magnets configured to move from a first landing nipple magnet state to a second landing nipple state when the actuator moves from a first actuator state to a second actuator state, the one or more landing nipple magnets configured to be magnetically coupled to one or more choke insert magnets located in the passageway.

12. The choke landing nipple as recited in claim 11, wherein the actuator is configured to move the one or more landing nipple magnets from the first landing nipple magnet state to the second landing nipple magnet state, and further including a power spring located in the isolated chamber and coupled to the one or more landing nipple magnets, the power spring configured to return the one or more landing nipple magnets from the second landing nipple magnet state to the first landing nipple magnet state.

13. The choke landing nipple as recited in claim 11, wherein the actuator is a first actuator configured to move the one or more landing nipple magnets from the first landing nipple magnet state to the second landing nipple magnet state, and further including a second actuator positioned within the isolated chamber and configured to return the one or more landing nipple magnets from the second landing nipple magnet state to the first landing nipple magnet state.

14. The choke landing nipple as recited in claim 11, wherein the actuator is a single actuator configured to move the one or more landing nipple magnets from the first landing nipple magnet state to the second landing nipple magnet state and return the one or more landing nipple magnets from the second landing nipple magnet state to the first landing nipple magnet state.

15. The choke landing nipple as recited in claim 11, further including a polished bore receptacle located proximate the second end, the polished bore receptacle configured to engage with a seal of a retrievable choke insert.

16. A well system, comprising:
a wellbore extending through one or more subterranean formations;
production tubing disposed in the wellbore;
a subsurface choke disposed in line with the production tubing, the subsurface choke including:
a choke landing nipple, the choke landing nipple including:
a housing having a passageway extending from a first end to a second end thereof;
an isolated chamber located in the housing;
an actuator positioned within the isolated chamber; and
one or more landing nipple magnets coupled to the actuator within the isolated chamber, the one or more landing nipple magnets configured to move from a first landing nipple magnet state to a second landing nipple state when the actuator moves from a first actuator state to a second actuator state; and
a retrievable choke insert located within the choke landing nipple, the retrievable choke insert including:
an outer housing including a central bore extending axially through the outer housing, an open end, a closed end, and one or more outer housing openings extending through an outer housing sidewall thickness;
a bore flow management actuator disposed in the central bore, the bore flow management actuator having one or more bore flow management openings extending through a bore flow management actuator sidewall thickness, the bore flow management actuator operable to convey subsurface production fluids there through; and
one or more choke insert magnets coupled to the bore flow management actuator, the one or more choke insert magnets magnetically coupled with the one or more landing nipple magnets of the choke landing nipple to slide the bore flow management actuator and move the one or more bore flow management openings relative to the one or more outer housing openings to control an amount of the subsurface production fluid entering the bore flow management actuator.

17. The well system as recited in claim 16, further including a landing nipple locking feature.

18. The well system as recited in claim 17, wherein the landing nipple locking feature includes a sliding sleeve and one or more locking features, the one or more locking features configured to engage with one or more latch profiles in the choke landing nipple.

19. The well system as recited in claim 18, wherein the sliding sleeve is configured to slide to move the one or more locking features from a radially retracted state to a radially extended state to engage with the one or more latch profiles in the choke landing nipple.

20. The well system as recited in claim 18, wherein the outer housing entirely surrounds the bore flow management actuator and couples to and surrounds at least a portion of the landing nipple locking feature.

21. The well system as recited in claim 20, wherein the landing nipple locking feature is slidingly fixed to the bore flow management actuator.

22. The well system as recited in claim 20, wherein the one or more locking features are configured to extend through the outer housing to engage with the one or more latch profiles in the choke landing nipple.

23. The well system as recited in claim 18, wherein the landing nipple locking feature and the bore flow management actuator are separate and distinct features.

24. The well system as recited in claim 16, further including one or more seals disposed radially about the outer housing, the one or more seals configured to engage with a polished bore receptacle of the choke landing nipple.

25. The well system as recited in claim 16, wherein the outer housing includes two or more outer housing openings extending through an outer housing sidewall thickness and the bore flow management actuator includes two or more bore flow management openings extending through a bore flow management actuator sidewall thickness.

26. The well system as recited in claim 16, wherein the actuator is configured to move the one or more landing nipple magnets from the first landing nipple magnet state to the second landing nipple magnet state, and further including a power spring located in the isolated chamber and coupled to the one or more landing nipple magnets, the power spring configured to return the one or more landing nipple magnets from the second landing nipple magnet state to the first landing nipple magnet state.

27. The well system as recited in claim 16, wherein the actuator is a first actuator configured to move the one or more landing nipple magnets from the first landing nipple magnet state to the second landing nipple magnet state, and further including a second actuator located in the isolated chamber and coupled to the one or more landing nipple magnets, the second actuator configured to return the one or more landing nipple magnets from the second landing nipple magnet state to the first landing nipple magnet state.

28. The well system as recited in claim 16, wherein the actuator is a single actuator configured to move the one or more landing nipple magnets from the first landing nipple magnet state to the second landing nipple magnet state and return the one or more landing nipple magnets from the second landing nipple magnet state to the first landing nipple magnet state.

29. A method for assembling and operating a subsurface choke, comprising:

positioning a choke landing nipple disposed in line with production tubing in a wellbore, the choke landing nipple including:
  a housing having a passageway extending from a first end to a second end thereof;
  an isolated chamber located in the housing;
  an actuator positioned within the isolated chamber; and
  one or more landing nipple magnets coupled to the actuator within the isolated chamber, the one or more landing nipple magnets configured to move from a first landing nipple magnet state to a second landing nipple state when the actuator moves from a first actuator state to a second actuator state; and
inserting a retrievable choke insert within the choke landing nipple located in the wellbore, the retrievable choke insert including:
  an outer housing including a central bore extending axially through the outer housing, an open end, a closed end, and one or more outer housing openings extending through an outer housing sidewall thickness;
  a bore flow management actuator disposed in the central bore, the bore flow management actuator having one or more bore flow management openings extending through a bore flow management actuator sidewall thickness, the bore flow management actuator operable to convey subsurface production fluids there through; and
  one or more choke insert magnets coupled to the bore flow management actuator, the one or more choke insert magnets magnetically coupled with the one or more landing nipple magnets of the choke landing nipple to slide the bore flow management actuator and move the one or more bore flow management openings relative to the one or more outer housing openings to control an amount of the subsurface production fluid entering the bore flow management actuator.

30. The method as recited in claim 29, further including actuating the actuator to move the landing nipple magnets from a first landing nipple magnet state to a second landing nipple state and in turn move the one or more choke magnets from a first choke insert magnet state to a second choke insert magnet state and in turn move the bore flow management actuator to at least partially align the one or more bore flow management openings and the one or more outer housing openings.

31. The method as recited in claim 29, further including removing the retrievable choke insert from within the choke landing nipple, and then inserting a replacement retrievable choke insert within the choke landing nipple.

32. The method as recited in claim 31, wherein the inserting and the removing including using a wireline, coiled tubing or a wellbore tractor to replace and remove.

33. The method as recited in claim 29, wherein the inserting the retrievable choke insert within the choke landing nipple includes inserting the retrievable choke insert within the choke landing nipple in a single downhole trip.

34. The method as recited in claim 29, wherein the inserting the retrievable choke insert within the choke landing nipple includes inserting the retrievable choke insert within the choke landing nipple in two downhole trips.

* * * * *